US008447627B1

(12) United States Patent
Cruise

(10) Patent No.: US 8,447,627 B1
(45) Date of Patent: May 21, 2013

(54) MEDICAL SERVICES CLAIM MANAGEMENT SYSTEM AND METHOD

(75) Inventor: Mark R. Cruise, Berwyn, PA (US)

(73) Assignee: Encoda LLC, Plymouth Meeting, PA (US)

( * ) Notice: Subject to any disclaimer, the term of this patent is extended or adjusted under 35 U.S.C. 154(b) by 1191 days.

(21) Appl. No.: 12/253,871

(22) Filed: Oct. 17, 2008

Related U.S. Application Data

(60) Provisional application No. 60/980,714, filed on Oct. 17, 2007.

(51) Int. Cl.
*G06Q 10/00* (2012.01)
(52) U.S. Cl.
USPC .................................. 705/2; 705/3; 705/4
(58) Field of Classification Search
USPC ......................................................... 705/2–4
See application file for complete search history.

(56) References Cited

U.S. PATENT DOCUMENTS

| 4,858,121 | A * | 8/1989 | Barber et al. | 705/2 |
|---|---|---|---|---|
| 7,685,006 | B2 * | 3/2010 | Rahn et al. | 705/3 |
| 2001/0027403 | A1 * | 10/2001 | Peterson et al. | 705/4 |
| 2002/0116389 | A1 * | 8/2002 | Chen et al. | 707/103 R |
| 2007/0005403 | A1 * | 1/2007 | Kennedy et al. | 705/4 |
| 2009/0157433 | A1 * | 6/2009 | Schmidt et al. | 705/4 |

OTHER PUBLICATIONS

LeCuyer, et al. "Overhauling the US healthcare payment system," The McKinsey Quarterly, The Online Journal of McKinsey & Co., Web exclusive, Jun. 2007, pp. 1-6. http://www.mckinseyquarterly.com/article_print.aspx?.
Athenahealth, Inc. "Athenahealth and Humana Launch First Fully-Integrated National All-Payer Platform for Real-Time Adjudication," PrimeNewswire, Oct. 19, 2007, www.primenewswire.com, 2 pages. http://www.electroniclaim.com/primer.html.
"Health Care Claim: Institutional", National Electronic Data Interchange Transaction Set Implementation Guide, ASC X12, Insurance Subcommittee Implementation Guide, May 2000, pp. 1-634.
"Health Care Claim Payment/Advice", National Electronic Data Interchange Transaction Set Implementation Guide, ASC X12N, Insurance Subcommittee Implementation Guide, May 2000, pp. 1-252.
"Health Care Claim Status Request and Response", National Electronic Data Interchange Transaction Set Implementation Guide, ASC X12N, Insurance Subcommittee Implementation Guide, May 2000, pp. 1-302.

(Continued)

*Primary Examiner* — Lena Najarian
(74) *Attorney, Agent, or Firm* — Sunstein Kann Murphy & Timbers LLP

(57) ABSTRACT

Methods for managing requests by a medical services provider for payment from a payer are described. In one embodiment, claims are aggregated into a single file and submitted for payment electronically. If a file level rejection occurs, rejected claims are removed and the single file reformed and resubmitted. This is repeated as necessary until the file is accepted. In another embodiment, claims are assigned first unique identifiers and line items in claims are assigned second unique identifiers. The unique identifiers are used to track every transaction. In another embodiment, an explanation of benefits relating to a claim is received and processed. Copayments are reallocated to line items according to the explanation of benefits. Writeoffs and transfers to next payers are performed automatically according to adjudication codes in the explanation of benefits.

21 Claims, 16 Drawing Sheets

OTHER PUBLICATIONS

Davis, Bob "The Evolution of the ANSI ASC X12N 837 format from the UB-92 Flat file format," Jan. 13, 2004, pp. 1-13.

Dwyer, et al. "Health Insurance Portability and Accountability Act," Security Issues in the Digital Medical Enterprise, Society for Computer Applications in Radiology, Second Edition, Chapter 2, Apr. 2004, pp. 9-18.

* cited by examiner

MEDICAL SERVICES CLAIM MANAGEMENT SYSTEM AND METHOD

The present application claims priority from U.S. Provisional application Ser. No. 60/980,714, filed Oct. 17, 2007, the full disclosure of which is hereby incorporated by reference herein.

TECHNICAL FIELD

The present invention relates to computerized methods and systems, and more particularly to methods and systems for medical services claim management.

BACKGROUND ART

Computerized handling of claims and payments in the healthcare field has been around since the early 1980's or late 1970's. At that time, various Blue Shield entities and Medicare already were handling claims and payments internally with computer systems, and between their internal computer systems, and they were exchanging claims and payment data with the computer systems of medical practices. Although Medicare is a governmental payment system, the processing of claims and payments for Medicare is handled by nongovernment intermediaries, traditionally dominated by Blue Shield entities. So the Blue Shield entities were said to have two lines of business-one was private (the commercial Blue Shield line of business) and the other was Medicare. Thus Medicare and the Blue Shield private line of business became computerized at about the same time. (Medicaid, which, like Medicare, is a governmental payer handled by intermediaries, was computerized at a later date.) The practices of most doctors in the United States are small. A decade ago there were approximately 500,000 doctors in the United States. As of September 2005 there were about 800,000. According to the report entitled Medical Group Practices in the US, published by the AMA in 2006, reflecting data as of Sep. 30, 2005, only 1,265 physician practices have more than 25 doctors. If you define a group as 3 or more physicians, only 240,773 (about 30%) of the total number of physicians are in groups. Clearly, just due to size, the resources available to doctors to mount effective technology-based tactics to defend against inappropriate adjudication and reimbursement by insurance companies is limited as compared to the resources of the payers. Back in the early 1980's, the average size of a medical practice was even smaller. In 1982 only about 15% of doctors were computerized at all. Those doctors depended on expensive minicomputers, each of which ran proprietary CPUs which, in turn, required individual proprietary operating systems, and only the largest of the practices could afford them. Typically software for these physician practices was provided by vertical market application software vendors. Typically each software vendor had to make a deal with a particular hardware manufacturer and usually resigned himself to programming for one specific platform hardware/operating system combination. Thus software offerings for these computerized physician practices, constituting the first 15% of all the doctors to computerize, were balkanized into a series of proprietary hardware/software vendor combinations. Change the hardware; you had to change the software. Change the software; you had to change the hardware. The division between hardware and software was blurred. One example in the medical field was Contel. Another is MUMPS. MUMPS based application programs also controlled the hardware. Thus your application was also your operating system.

As the era of the minicomputer wound down, the era of the microcomputer emerged. The advent of the microcomputer involved really not just the notion of the microcomputer per se (a computer on a chip) but also an adoption of only a few standard CPU chips, memory, and operating systems. Thus the microcomputer ushered in an era of standardized computer hardware and standardized operating systems. As these first two layers of the onion became standardized, many new medical application software companies were formed to offer software running in standard operating system environments such as CP/M, MP/M, DOS, Xenix (a small memory model Unix) and PC networks communicating through Novell. In this way the application developers could spend all their time writing new application level features and benefits rather than chasing the incessant changes being made to proprietary hardware and their twinned proprietary operating systems. Using the onion metaphor, the operating system companies made sure their operating system dealt on the inside with the changes in hardware while maintaining a constant interface on the outside to the higher layer of the application.

The idea of standard databases was brand new then, too. Relational databases had only been brought to market in the latter 1970's. Prior to that, all databases were hierarchical in nature and were by definition proprietary. MUMPS is a hierarchical database. Further, all the vendors wanted to provide to their clients a high financial barrier (a stick, not a carrot method, of creating what in the Internet world is called a "sticky" client) for defecting to a competing software system. Thus, despite the presence of standardized hardware and standardized operating systems, almost all healthcare software vendors offered a system that was incompatible with all other systems at the doctor office, and the technical specifications of the data and everything related to it were top secret. The balkanization of physician software thus remained a business fact during the transition from minicomputers to microcomputers, each software system incompatible with the next.

The bigger PMS ("Practice Management Software") companies got together with the bigger insurance companies (which we sometimes call here the "payers") and agreed on what each insurance company needed in the way of data. The strategy of the PMS companies was to get in the critical path of the transactions between the medical providers and medical payers in order to monetize their strategic position. It was said that the PMS vendors "controlled" the doctors. They could aggregate the claims from the medical providers and distribute to payers and do the same thing on the payments back from the payers to the medical providers. Under this PMS vendor strategy the system of each physician's practice group creates a superset claim file (one with many data elements—more than were needed) and then this claim file is shipped directly to the software vendor or to a third party organization (called a clearinghouse) that would then convert those proprietary-to-the-vendor claim files into the formats that were proprietary to-the-payer. Thus changes did not have to be done at the edges of their client networks but could be accomplished in the PMS vendor core—either in house or farmed out. This was not only more economical and efficient for the PMS vendor, it perpetuated the state in which what the doctor had on his server was not in compliance with what the payer needed.

The software vendors, which we will sometimes call "PMS vendors" ("Practice Management Software vendors") had created standard meta formats at their client sites, and were sending data, either to themselves or to clearinghouses with which they had made lucrative deals, with their in-house proprietary format. At that point the vendors had the data converted into proprietary-to-the-payer formats for each of the major payers. In those days, the clearinghouses, whether in-house at the PMS vendor or independent, were making significant money on every transaction. The clearinghouses were charging the payers to aggregate, normalize and submit claims to them electronically and feed back payments to the PMS vendors. The clearinghouses were paying PMS vendors a percentage of that, about 35 cents for each transaction sent through them, a small fraction of what it cost to handle those transactions manually (The cost to handle manual claims is very much higher than the cost to handle electronic claims.) Finally, the PMS vendors were also charging their doctor clients for the service. The revenue stream to PMS vendors was not based on the dollar amount of the claim for payment but rather the number of claims. For the clearinghouses, pediatrician clients were much more lucrative than brain surgery clients because the former had (for example) 20 times the number of transactions.

It is now required that if you sell health insurance that you must offer standard format electronic data interchange. This standard, promulgated under the auspices of the Accredited Standards Committee (ASC) of the American National Standards Institute (ANSI) of Washington, D.C. (headquarters) and New York, N.Y. (operations), is known as ANSI ASC X12. The ANSI ASC X12 Standard and its related implementation guides are hereby incorporated by reference herein and can be found at www.wpc-edi.com. Three such implementation guides are attached hereto as Appendices A, B and C. X12 messages are not intended to be readable by humans. There are no spaces, carriage returns or line feeds in the messages. Yet, current law says the only data points sent back to the provider that are the legal basis for appeal and review are the X12 data points.

Medicare, Medicaid and Blue Shield became a large portion of medical business. For the most part, each computer system evolution at the payer level was put out to the bid and the lowest bidder got the business. The structural impact of this situation was further balkanization of claims and payments processing software. Within a payer, like Blue Shield of Pennsylvania, the adjudication system could have been programmed by one company, the claims-in system programmed by another company and the payment-out system programmed by yet a third company. Furthermore, the maintenance of a software system was not always performed by the same vendor as the one that developed the system and the maintenance vendors also changed frequently.

The balkanized software development environment of these systems caused the payers to wind up with enterprise systems that even within their own enterprise were not integrated. They were interfaced. An interface can be understood as a chasm between two systems that is a quarter inch wide and a million miles deep. The reason, as we have explained, is that each aspect of a payer system was typically developed independently of any other aspect.

Another thing that happened was, in all conversations between PMS vendors and payers, the details of what happened internally at the payers were deemed to be of no concern to the PMS vendors, and the details of what happened inside the PMS software was deemed of no concern to the payers. This circumstance implies the definition of an "interface." When dealing with an interface, you define everything that has to flow between two environments, but you do not deal with what happens inside each of the end environments.

In this minimalistic world of sharing, only the basics were covered. A claim was sent by a PMS vendor. The payer did not care if a claim was actually sent or not, nor was a record generated at the PMS side documenting that a claim was sent (or received) or not. The notion of what the payer did not get—but should have—was not dealt with. The PMS software of a physician's practice simply recorded the date on which the PMS system marked the item as billed. The PMS would send it to a clearinghouse or a payer. The payer may or may not have acknowledged to the submitter that they got a file. Where there was a clearinghouse sometimes the clearinghouse would receive this payer acknowledgement, reprocess it, thus destroying its integrity in the sense of evidence custody, and send its own formatted-for-printing rendering to the practice. And sometimes not. More often the practice would get an acknowledgement that the clearinghouse got the file. Acknowledgements were messy affairs. They were not defined in the PMS at the provider office as a data element. They were not charges; they were not payments; they were not adjustments. They were files and PMS software pretty much viewed the world as charges, payments and adjustments. The process of sending and receiving data streams was necessary for input and output to occur but almost nothing about those processes was recorded in a meaningful way within the PMS. Provider clerks would dial in to receive formatted reports via download processes, suitable for printing, which would tell a human being who caused the claim file to go out that the file had been received. The human being received a piece of paper—a "report"—that said "file #XYZ was received." A line item had a certain claim number and that claim number was billed on such and such a date and there was only one file for that date, so the "report" that said "items had been received from a specific company for that date" must have included that claim number. But that "report" was a piece of paper. Even if you file it in a physical cabinet, it is electronically inaccessible.

Most insurance companies have a strict first gate process in which they decide if they are accepting the file, if it is syntactically correct, if it contains claims from providers they recognize, etc. This system, employed by a payer, determines whether the whole file of claims should be accepted or rejected for processing. This evaluation generates an acknowledgement. This acknowledgment is not a part of the charge line item history record in the normal PMS database. And as stated previously, there is no guarantee that this acknowledgement gets to the medical practice.

Then the accepted claim goes to a second system, which determines for each claim if the patient is covered under the insurance policy. The second system has output that says "yes, there is coverage" or "no, there is not coverage" for each claim and contains the specific reason for the denial. All payers known to the applicant herein say they generate such a coverage determination. They make it available to the clearinghouse.

Following the coverage determination, there is an adjudication leading to a flat-out denial, a partial payment or a full payment. Rarely is there a full payment. 99% of payments involve a partial payment. The payer sends back a file that explains the payments and the denials. The PMS systems were programmed to read this file (generically called an "electronic EOB", short for "Explanation of Benefits") and make the payments and adjustments that were outlined in this file.

In other words, the transactions between the medical practice provider and the payer (whether through a clearing house or not) involve the following sequence, from the point of view of the medical practice:

1. Claims generation.
2. Claims submission.
3. Claims receipt.
4. Eligibility receipt
5. EOB back to provider
6. Payment to provider Yet although the transactions involved these six distinct activities, the only reasonably accessible electronic records generated for use by the average PMS system are:

1. Claims generation.
5. EOB back to provider

Finally, as we have discussed, the payers have different systems in their own enterprise that are interfaced. The claim comes into one system and is then accepted or rejected. It then goes to another system for the eligibility phase and it is accepted or rejected and it then goes to another system for the adjudication process where it is accepted and paid in full or part or denied. If a medical practice sends in claims by paper it hits one system. If it sends in claims electronically in one format the claims hit a different system. If it sends in claims using the X12 standard, the claims could hit another system.

The model of current PMS software is to seek redress one claim at a time. The tools developed by the PMS vendors and the insurance payers support this approach, and the published procedures by which the providers are supposed to contact the payers support this approach. And prior to X12, providers did not even have the actual codes by which the payer had to legally defend its position.

This "appeal one claim at a time" model that all PMS systems known to the applicant use seems improbable until one examines the process by which PMS vendors developed the functionality of their software. The PMS vendor programmers got their input from the PMS vendor salespersons. The PMS vendor salespersons got it from the medical provider office managers. And the medical provider office managers got it from the insurance payers. Thus the payers drove the development of the PMS functionality and that is why all PMS software works similarly.

These systems do not scale. The larger the medical practice the higher the expense to seek payment from the payers. Systems that do not scale do not have fixed cost to revenue expense ratios; they have adverse ratios. They have adverse economies of scale. Thus, the larger the medical practice gets using tools that do not scale to seek payment from payers, the more expensive per transaction it becomes to seek that payment.

This is part of the reason there are so few large practices. The frenzied mergers of medical practices in the 1990's, all seeking to achieve economies of scale and negotiation muscle with payers have largely been undone. The sheer amount of data, the quasi-automation ("manu-mation") work flow systems, the missing data elements necessary to manage appropriate payment, all conspired to make the larger units even less efficient than the smaller component parts, and the cost to handle each transaction went up, not down.

Following adoption of the ANSI X12 standard, software systems used by payers have been modified to accept claims for delivery of medical services that use the X12 format. However, for reasons described previously, the X12 format has not been universally rolled out. In most cases, even though the insurer must accept claims in the X12 format, clearinghouses, by arrangement with the PMS vendors, continue to accept proprietary formats from medical providers, and then translate claims aggregated from multiple physician practices into X12 or an agreed proprietary format worked out with the insurer. The reverse happens for any transactions that get back to the medical provider using the traditional PMS. We illustrate in FIG. 1 a typical prior art scheme pursuant to which doctors' services are paid. A claim may originate from a physician practice through a health care service provider system 20, using some proprietary PMS system generating a claim in a proprietary format. This claim goes to clearinghouse 22, where the claims are processed into some format (which may typically be a format developed under agreement with the insurer, but may alternatively be in X12 format) for communication with the payer proprietary reimbursement processing system 14 of the insurer. Accordingly, the physician practice communicates only via the clearinghouse with the insurer and never has a direct link with processes going on at the insurer, and does not know how the reports from the clearinghouse mesh with processes that are followed by the insurer in handling claims from the physician practice.

The clearinghouses typically give the health care service providers a printed report identifying claims that will not or have not been accepted by the insurer. This report may or may not be an analog to an X12 file level rejection (an X12 997 transaction). The clearinghouse may or may not give more detail, such as the reason for the rejection. The health care service provider must then unbill the entire file of claims, then locate and fix or remove the offending claims and rebill, transmitting the revised file to the clearinghouse. This process is performed iteratively by hand until the file gets accepted.

The insurer then sends back to a clearinghouse a File 277 or proprietary file, which is an eligibility determination prior to adjudication. The clearinghouse may or may not read and/or process the determination and may or may not notify the physician practice. Without the forwarding to the PMS of this determination, from the point of view of the traditional PMS and interchange arrangements between the provider and payer, claims that have been filtered out by this determination simply disappear from the final payer response. The only clue that something is amiss is that the items on the doctors' medical billing system age. Such aging claims require manual attention and this requirement for manual attention acts adversely to economies of scale. Recently payers and clearinghouses have taken to making available on a website issues like this. But this, as are most all current state of the art systems, is also outside the PMS system and not part of an actionable data element within the PMS.

SUMMARY OF THE INVENTION

In accordance with an embodiment of the present invention, the computerized method of managing requests by a health care service provider for payment includes submitting multiple claims electronically in a single file and responding to any file level rejection by re-creating the multiple claim file request without the rejected claims. A denial record is created for every rejected claim. The acts of submitting multiple claims in a single file and responding with a re-created file are repeated automatically, as necessary, until the single file is accepted. These acts are performed by the computer system without requiring human intervention.

An embodiment of the present invention further includes associating with each claim for payment, a unique identifier. The identifier is placed in a field required by standards to be preserved by the payer in the course of processing. Thereafter, in connection with any transaction involving a rejection for payment of a given claim, that transaction is stored in association with the identifier for the given claim. Unique identifiers are also advantageously associated with each line item of a claim. Again, the identifier is placed in a field required by standards to be preserved in the course of processing, so that a record of all transaction events may be maintained for each line item. In one embodiment, partial payments to line items are compared to expected payments and are processed in the same way as rejected line items if the partial payment is unsatisfactory.

An embodiment of the present invention further includes receiving, over a network, an explanation of benefits. The explanation of benefits contains the unique identifiers associated with claims and line items, a check number, and procedure codes associated with the line items. The explanation of benefits is stored in association with the unique identifiers.

A co-payment processing method of the invention operates on the explanation of benefits received from the payer. In one embodiment, all co-payments previously collected by a medical provider are reversed to a suspense account in the healthcare service provider system for all line items referenced in the explanation of benefits. In another embodiment, the co-payment allocations in the explanation of benefits and the health care service provider system are compared, and only those line items with differing allocations are reversed. Then the co-payment is re-allocated from the suspense account in the health care service provider system to the line item to which the allocation was made in the explanation of benefits so that the PMS data exactly mirrors the payer allocations. In this way time is not wasted in attempting to reconcile different handlings of the data. The PMS and the payers systems are brought into conformity. The payer can not avoid or delay payment by stating that the provider system is inaccurate.

Adjudication codes received in the explanation of benefits are mapped to associated actions. Action codes of Suspend, Write-Off, Transfer, and Null are assigned in the map-to look up table so that the adjudicated amounts can be handled accordingly. The Write-Off action will cause the system to make an adjustment for the adjudication amount as specified in the explanation of benefits. The Transfer action will cause the system to transfer the balance of the line item to a next payer and does not adjust the adjudication amount. Suspend will neither adjust the adjudication amount nor cause a transfer. Furthermore, it will prevent or suspend any other Transfer action on the line item from taking effect. The Null action has no effect.

Check numbers received in the explanation of benefits are used to identify deposits to the health care service provider's bank account and associate the deposits with the appropriate claims and line items in the explanation of benefits. A user is periodically notified electronically of all deposits received since the previous notification. In one embodiment, this is done by electronically accessing the health care service provider's bank account transaction history and processing the transaction history using a screen scraper. This enables posting dates within the PMS and actual deposit dates to be identical.

Procedure codes used in the explanation of benefits are associated with line items. Procedure codes and the amounts paid to their associated line items over a large history of transactions are stored in a relational data base configured according to a star schema. The payments are subjected to statistical analysis. A model set of expected payments for the procedure codes is also generated and analyzed. The two statistical analyses are then used to calculate a metric relating payments received to the expected payments. The actual payments, the expected payments, and the metric are displayed in a table, graph, or any other convenient format. If the metric is outside of a predetermined range for one of the procedure codes, the user is alerted of the procedure code.

An embodiment of the present invention further provides a denial management system. A denial management operator selects a plurality of line items. The denial management system presents a denial management operator with a screen showing the plurality of line items. The denial management system allows the denial management operator to then select any particular one of the line items, and provides a screen wherein data fields associated with the line item can be edited. The denial management operator may also change the status of the line item in the claims management system directly through the screen.

An embodiment of the present invention further provides an automated claim resolution system. Rejected claims are automatically selected that have data fields containing the same values as each other. If the common data value is incorrect, a user corrects the value by means of a single manual edit, and the system automatically applies the change to each of the selected claims. The claims are then marked as partially resolved, and once a claim has no remaining unresolved denials it can be resubmitted.

An embodiment of the present invention further provides an automated settlement posting function. A check is received from a payer as part of a settlement agreement covering a plurality of claims. The settlement check must then be distributed across the plurality of claims. First the total disputed payment amount across all the claims covered by the settlement is calculated, and then the user may choose a rule by which to apply the settlement amount, the simplest being a ratio calculated by dividing the amount of the settlement check by the total disputed payment amount and then reducing each outstanding charge by this ratio and marking it as paid in the database.

The foregoing features of the invention will be more readily understood by reference to the following detailed description, taken with reference to the accompanying drawings.

BRIEF DESCRIPTION OF THE DRAWINGS

FIG. 12 is a user interface illustrating management of a co-payment in accordance with an embodiment of the present invention.

FIG. 14 is a user interface illustrating a screen in a denial management system in accordance with an embodiment of the present invention.

FIG. 15. is a user interface illustrating a screen in a denial management system in accordance with an embodiment of the present invention.

DETAILED DESCRIPTION OF SPECIFIC EMBODIMENTS

Definitions. As used in this description and the accompanying claims, the following terms shall have the meanings indicated, unless the context otherwise requires:

A file 835 is an ANSI ASC X12 file that provides an explanation of benefits from the payer. It itemizes the charge received from the health care service provider, the amount paid by the payer, and then for each part of the charge that it does not pay it itemizes that amount and associates it with an adjudication code. It may be accompanied by one or more checks.

A "payment" as used herein is a payment transaction described in an explanation of benefits from the payer. It identifies an amount of money for a specific charge.

A "check" as used herein is a set of related payments associated with an explanation of benefits, such as a file 835. The payments may be provided by a paper check, electronic funds transfer or any other commercially accepted manner.

A "health care service provider" as used herein is a person or entity that provides services to customers and seeks at least part of the payment for those services from a payer by submitting claims according to a standard for health care claims, such as the ANSI ASC X12 standard.

Figure 1:
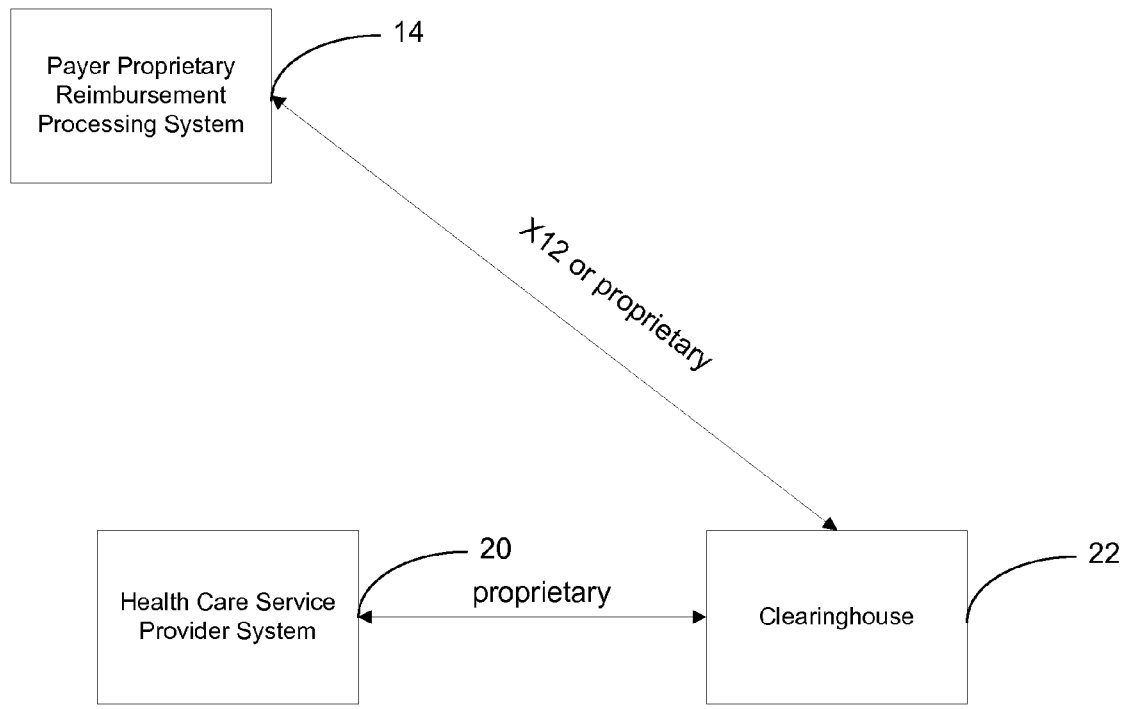
FIG. 1 is a schematic block diagram of a medical claims management system of the prior art.
Figure 2:
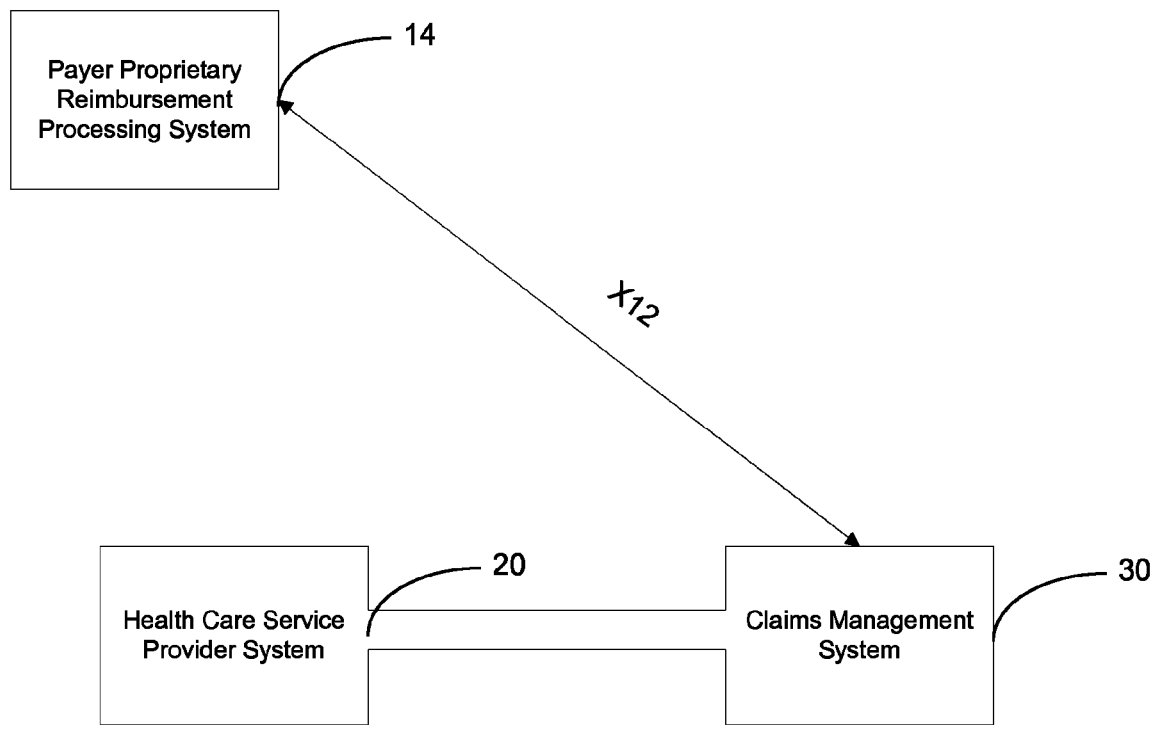
FIG. 2 is a schematic block diagram of a medical claims management system in accordance with an embodiment of the present invention.

Referring now to FIG. 2, a medical claims payment system in accordance with an embodiment of the invention is shown. A claims management system 30 has been added in connection with the health care service provider system 20. The connection can be made over a network or a direct hardwired connection or the two systems might be integrated into a single system. The network may be any of a number of communication channels including but not limited to the Internet, a wide area network, a local area network, a wireless network, a cable connection, a satellite connection, or a telephone line connection. The medical claims management system 30 performs several unique functions directly in the X12 environment to assist the health care service provider in obtaining its rightful payment for medical charges. Moreover, it is desired that the claims management system 30, accelerate and simplify the processing of claims between the health care service provider and the payer. For example, the claims management system may aggregate claims into a file for electronic submission over a network to the payer proprietary payment processing system 14. As set forth above a network may be any of a number of communication channels including among others the Internet. To accelerate acceptance of the claims, the claims management system may be programmed to automatically respond to a file level rejection. For example, by removing rejected claims from the claim submission file, a new file may be sent out with the remaining claims. Should the file be rejected again at the file level, the claims management system automatically performs this process again until a file level acceptance of the claims file is obtained. In addition, to provide the health care service providers with better information for challenging the rejection of medical charges, the medical claims management system 30 of embodiments of the present invention may uniquely identify each line item charge. This unique identification is preferably one that is preserved in the X12 system so that a complete longitudinal record of all electronic transactions relating to that charge may be maintained by the claims management system.

In addressing issues of denials in the medical claims, misallocated co-payments by the health care service provider can be handled by the claims management system 30. By "misallocated co-payments," we mean only that the allocation of the co-payment by the health care service provider differs from the line item to which the payer allocated the co-payment. To avoid this, the medical claims management system 30, for all line items addressed in an explanation of benefits received over a network from the payer system, moves the allocation of co-payments in the health care service provider's system to a suspense account and then reallocates the co-payment from the suspense account in accordance with the co-payment adjudication that was made by the payer's proprietary payment processing system. This unallocation and reallocation of the co-payment is made possible by the ability to track all transactions relating to a unique identifier for each line item charge.

Each line item charge may result in a variety of actions by the payer system. For example, a payment may be made for a portion of the charge, another portion of the charge may be subject to a co-payment and the total charge may be reduced due to a capitation. Each of these actions by the payer system is accompanied by an adjudication code. In the past such codes were known as HCFA codes, but a claims management system of the present invention may be programmed for operation with any such system of known codes. These codes may be translated by the claims management system. In accordance with an embodiment of the invention, the translation may include an indication of whether the adjudication code is favorable or unfavorable. It is recognized that some adjudication codes are not necessarily favorable, such as when the payer has indicated the patient was not covered. If any of the adjudication codes encountered with respect to a line item is unfavorable then that line item will be added to the denial management queue. If no adjudication code is encountered that is considered unfavorable for a line item, the system can automatically proceed with the actions associated with the line item. Thus, the claims management system maps the adjudication codes to codes that allow the system to automatically complete the processing of those line items that have been favorably resolved and send to denial management those claims that require further attention. A denial management operator will then be provided with an opportunity to review the items in the queue to resolve any denials of payment that are not properly substantiated or that are properly substantiated and require corrective action on the part of the health care service provider. Given that the claims management system in accordance with embodiments of the invention provides a longitudinal record of the dates, content and payer file names of all electronic transactions relating to each line item, a denial management operator has access to all the information he or she needs to challenge an improper denial with the payer.

Figure 3:
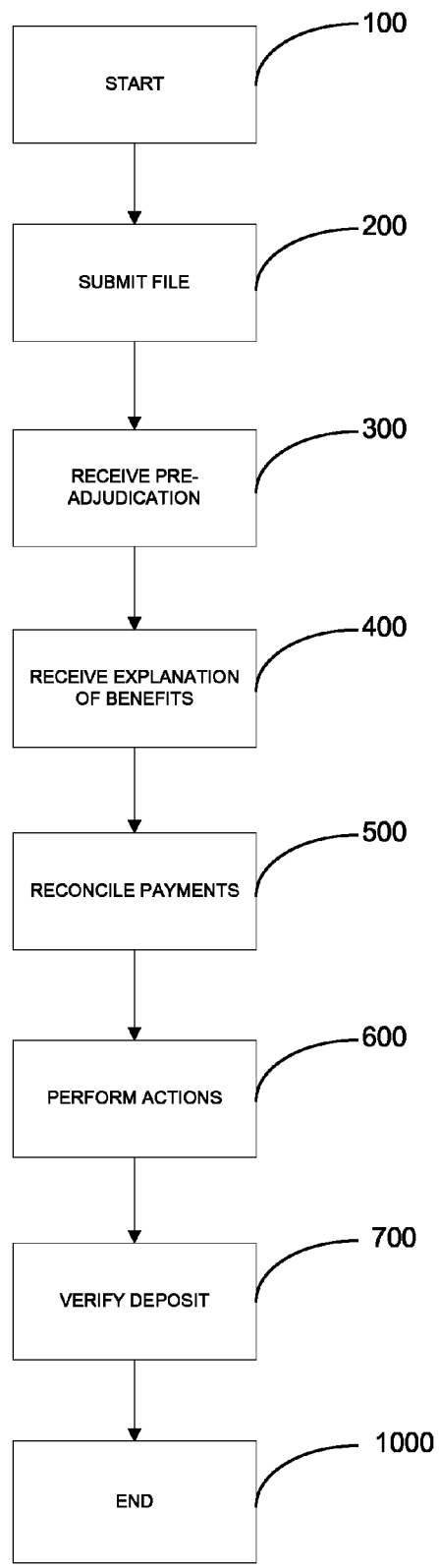
FIG. 3 is a flow chart of actions performed by a medical claims management system in accordance with an embodiment of the invention.

The medical claims management system 30 runs on a computer system. Program code runs on the computer system that performs, inter alia, some or all of the actions set forth in FIG. 3. These computer programmed aspects of the medical claims management system of an embodiment of the present invention will now be described. The charges that a health care service provider wishes to submit for payment to the payer are obtained by the medical claims management system. Information as to the charges may be provided to the payer directly over the network by the health care service provider 20, or alternatively, the health care service provider and payer may make use of a clearinghouse 22, whose system would interface with the medical claims management system to provide to the payer the information as to the line item charges.

Figure 4:
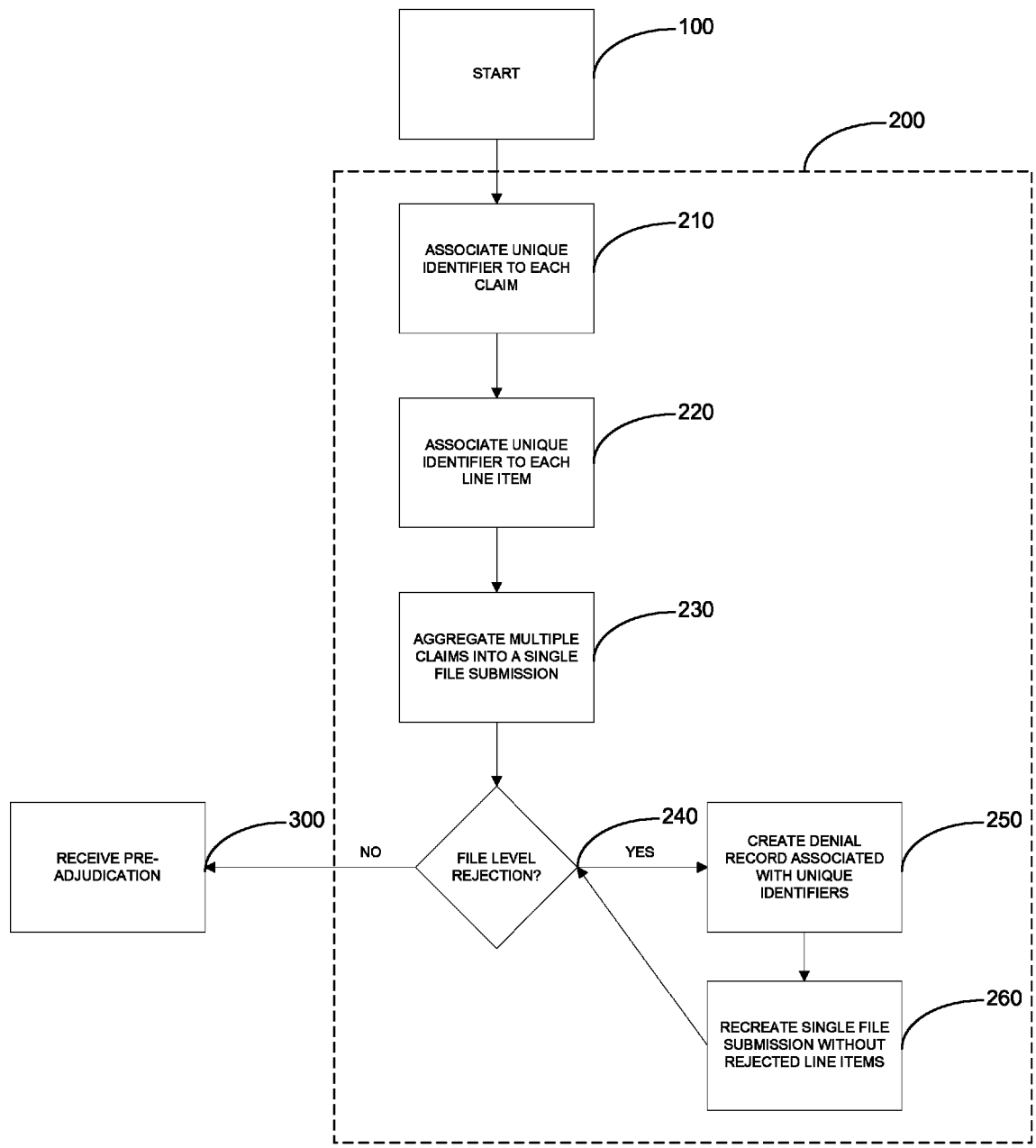
FIG. 4 is a flow chart of a file submission process in a medical claims management system in accordance with an embodiment of the present invention.

In accordance with an embodiment of the present invention, a processing flow begins 100 by entering the file submission phase 200. The file submission phase will now be described with reference to FIG. 4. In accordance with an embodiment of the present invention, a unique identifier is generated from data from the health care service provider system 20 for each claim 210. With respect to the ANSI X12 electronic claims submissions standard, the field CLM01 will be found useful for this purpose. In preferred embodiments, the unique identifier for CLM01 is created as a combination of data including whatever database element the provider practice management system uses to identify the charges that will be aggregated into one claim and additional data elements such as the account number, dataset number identifying the payee, policy holder's number or other identifying data of the medical charge. Further in accordance with embodiments of the present invention, a unique identifier may be associated with each line item in a claim 220. In accordance with the ANSI X12 electronic claims submissions standard, the field REFER may be found to be particularly useful for this purpose. In accordance with the ANSI X12 standard, the data fields CLM01 and REF6R are required to be preserved in the transactions sent back and forth electronically between a payer and the representatives of the medical provider.

Multiple claims once uniquely identified are aggregated into a single file submission 230. In accordance with the ANSI X12 standard, the outgoing claims file is known as a file 837. The payer system first reviews the 837 on a file level. Either the file will be accepted or rejected at this level 240. The acknowledgement response from the payer in accordance with the ANSI X12 standard is known as a 997. Rejections at this level typically relate to the credentials of the health care service provider and syntactical errors. If there is an error then a file 997 rejection may be appropriate. Rather than simply print out a record of the rejection and await manual intervention, embodiments of the present invention make a record 250 of the 997 in association with the unique identifiers of the affected claims and underlying line items. The medical claims management system 30 then automatically re-generates a claims submission file without the offending claims 260. The maintenance of the denial record and the resending over the network of a claims submission file (such as a file 837) continue iteratively until an acceptance is received.

Figure 5:
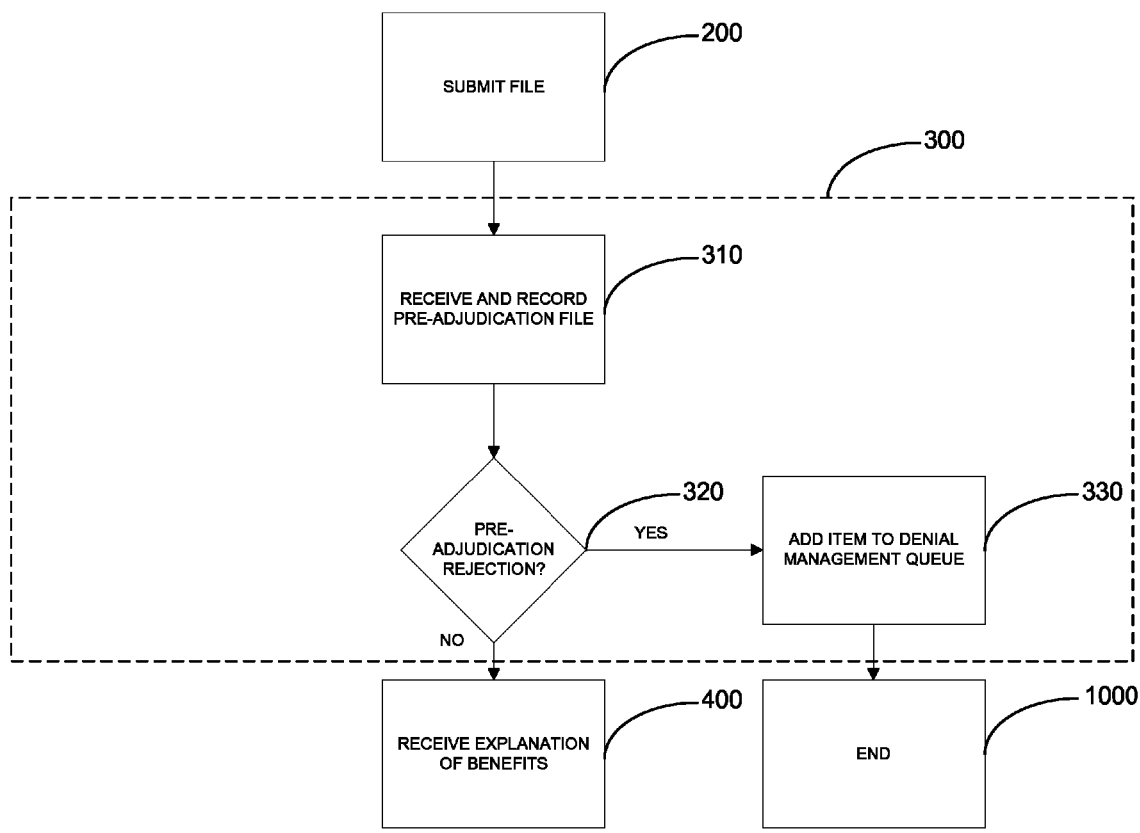
FIG. 5 is a flow chart of a pre-adjudication handling process in a medical claims management system in accordance with an embodiment of the present invention.

After file level acceptance is received, the payer may conduct a pre-adjudication review. In this review, claims are either passed on to the adjudication system or may be denied for a number of reasons. Typically though at this level denials relate to the patient credentials. Perhaps the patient policy number, name or address has been misspelled or mistyped. The pre-adjudication processing 300 is now described with reference to FIG. 5. Pre-adjudications, both acceptances and denials, sent from the payer are received by the medical claims management system 30 and recorded in association with the related claims and underlying line items 310. In accordance with the ANSI X12 standard, the pre-adjudication is a file 277 and the unique identifiers in the fields identified as CLM01 and REF6R are included in the 277. Thus, for any line item the claims management system 30 knows right away if the claim in which it appeared made it through this preadjudication phase or was denied and, thus, not passed on the adjudication system. If the line item was denied 320, the item is passed to a denial management queue 330 where the pre-adjudication denial can be immediately addressed by the health care service provider 1000.

Figure 6A:
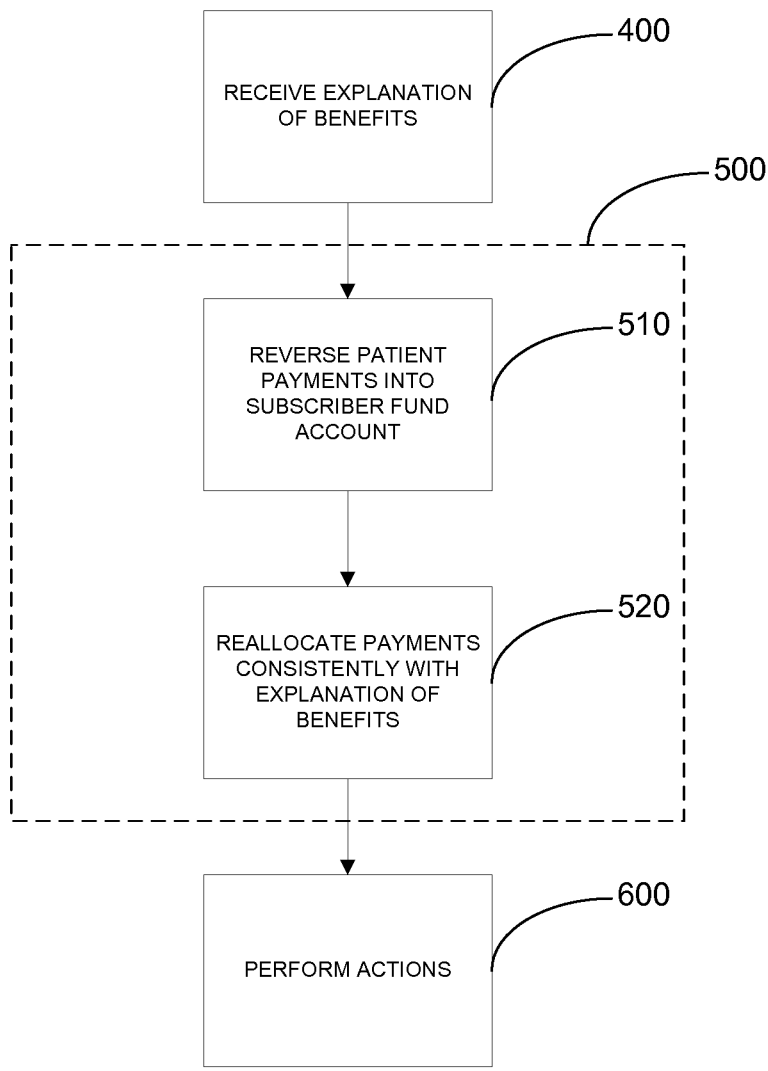
FIGS. 6A-B are flow charts of payment reconciliation processes in a medical claims management system in accordance with two embodiments of the present invention.

Claims that pass file level and pre-adjudication reviews are submitted to full adjudication in the payer's system. Adjudication produces an explanation of benefits which is received over the network and recorded 400 by the medical claims management system 30. The explanation of benefits is stored in association with the unique identifiers relating to the claim and line items it references. At this point in the processing flow, it is advantageous to provide a payment reconciliation process 500, which is now described with reference to FIG. 6A. In accordance with an aspect of an embodiment of the present invention, after receiving an explanation of benefits over the network, for all line items addressed in the explanation of benefits any patient payments including co-payments are reversed 510, removing them from their respective line items and putting the payments or co-payments into a suspense account associated with the patient.

It is preferable that the claims management system 30 have access to the health care service provider system 20 for making all required payments and adjustments. There are several ways to interact with any computer database system. Some health care service provider systems may employ proprietary tools designed for exactly this purpose. Other systems also have proprietary tools that allow other programmers to write applications that hit the billing system in real time, just as the native billing system routines do. More modern systems are built on SQL compliant databases. There is also a standard called ODBC (Open Database Connectivity) that certain health care service provider systems may require. So an application makes calls to a database server for records to read and sends data to the database server to write.

The claims management system 30 locates the line item to which the payer allocated the co-payment (or other payment) and similarly allocates the co-payment (or other payment) to that line item from the suspense account 520. Again, this reallocation of the co-payment or other payment is preferably entered into the health care service provider system 20. The money is thus taken out of the suspense account and allocated to the line item consistent with the payer's allocation. The records of the payer and health care service provider are thus advantageously aligned, so that discrepancies can be more easily found and sorted out.

Figure 6B:
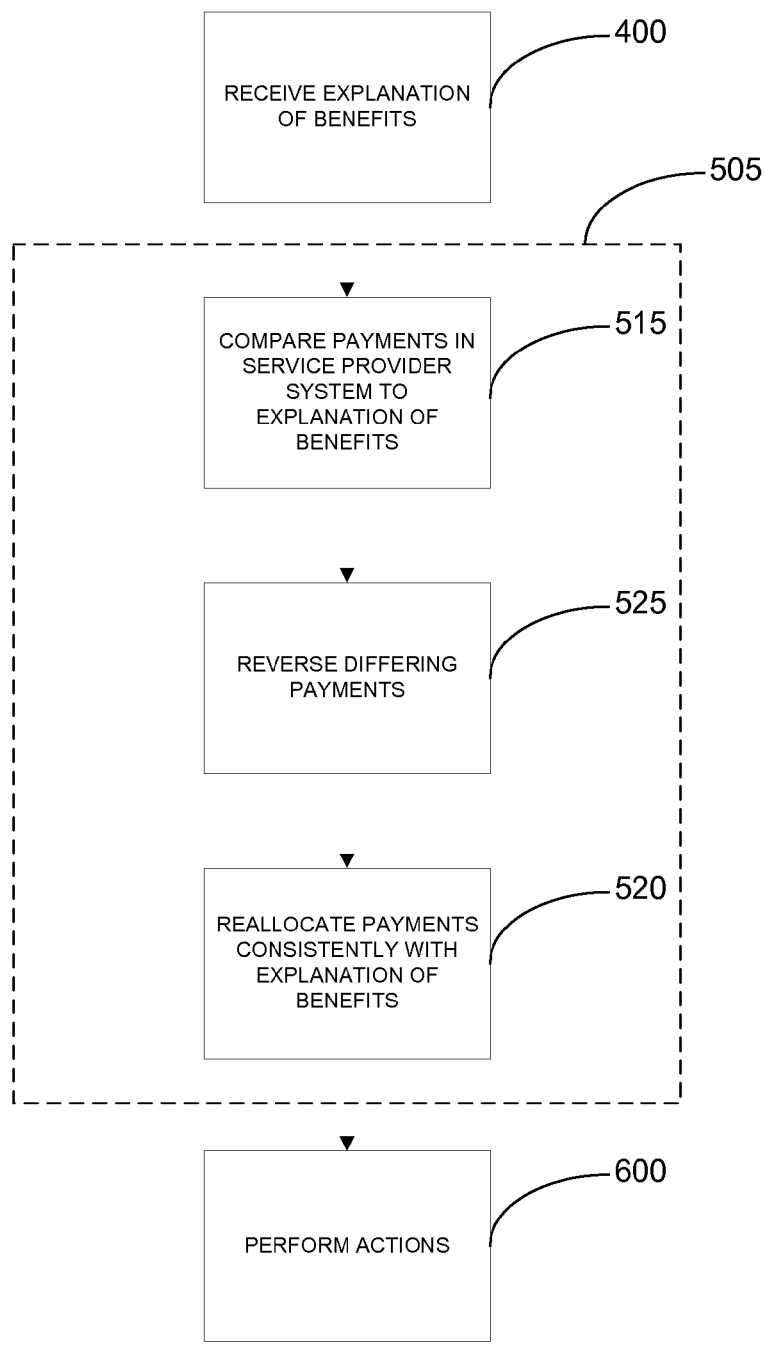

Because not every patient payment will be assigned inconsistently with the assignments in the explanation of benefits, it is further desirable to avoid reversing those payments that are assigned consistently with the explanation of benefits. A payment reconciliation process 500 in accordance with another embodiment of the present invention is here described with reference to FIG. 6B. The claims management system 30 compares the line items to which a payment was assigned in the health care service provider system 20 and by the payer 515. For only those payments that were assigned differently, the payments are reversed into the suspense account 525. Then the claims management system 30 allocates the co-payment (or other payment) to the line item to which the payer assigned it from the suspense account 520.

The explanation of benefits provides adjudication codes for each adjudication decision made by the payer with respect to a line item. It is helpful in evaluating and resolving denials for the adjudication codes to be translated into mnemonic terminology that can be more easily understood by human operators reviewing the records. It is also helpful that multiple similar payer adjudication codes be grouped by concept into fewer user friendly mnemonic codes. Moreover, the system can be programmed to respond to certain adjudication codes by taking certain automatic actions. An example of a configurable look-up table that may be stored in a database accessible to the medical claims management system is provided in Appendix A. For each payer adjudication code, the medical claims management system 30 allows the entry and storage of a narrative description, an action, a translated code, its narrative description and, if desired, a favorability indicator. For example, the payer adjudication code 1 (which in this case is a HIPAA Claim Adjustment Reason Code) means Deductible Amount. Medical insurance policies typically include a deductible amount that must be paid by the patient before the insurance company will assume liability. The action corresponding to adjudication code 1 is "Transfer." To carry out a transfer, the medical claims management system 30 would apply any credits dictated by the explanation of benefits and then automatically transfer the balance of the line item which would include the deductible amount to the next payer (another insurance company or the patient) as specified in the health care service provider system 20 so that a bill can be sent out by the health care service provider to the next payer. The health care service provider typically maintains a list of payers applicable to the patients therein. Thus, payment for the Deductible may be sought from a secondary payer. If there are no additional insurers on the list, the charge could be sent to the patient for payment. This whole process happens automatically. A Deductible adjudication code was considered favorable in this table because it does not present a reason for insertion into the denial management work queue for human review. The two letter translated code (under column header Den) is more easily recognizable than the numerical adjudication code. The letters are selected as an abbreviation or mnemonic code. For example, for Deductible adjudication codes the translated code is DE and there are multiple Deductible codes that translate to DE (see adjudication code 126). The message is a description of the translated code. Finally, the last field under column Dny is the favorability indicator.

A Transfer action has just been described above. A Write-Off action is performed by reducing the amount of the charge by the amount specified in the explanation of benefits. A Suspend action will take no action on the amount specified for the adjudication code that is mapped to Suspend and will, further, suspend any and all Transfers on the same line item, thereby preventing the balance from transferring to the next payer. A Null action will have no effect, so that effectively an adjudication code that is mapped to Null will be ignored. The use of a unique identifier with each line item when the claim was submitted by the medical claims management system to the payer forced the payer to use the unique identifiers in the explanation of benefits it sent back to the health care service provider. Thus, the medical claims management system can reliably identify the line item for all adjudications received—even if in the explanation of benefits the payer has changed data elements like account number or procedure code.

Figure 7:
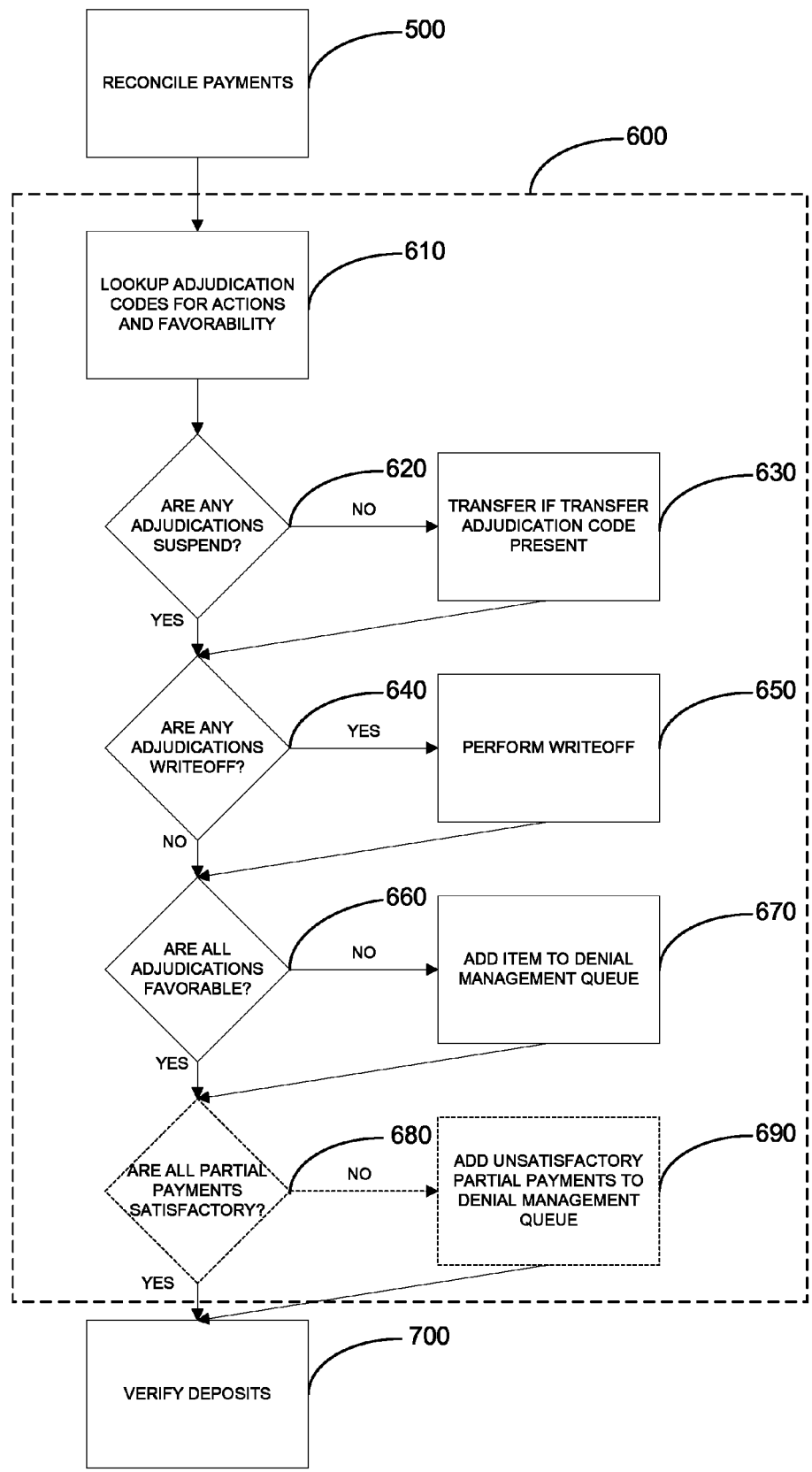
FIG. 7 is a flow chart of an adjudication code handling process in a medical claims management system in accordance with an embodiment of the present invention.

One process flow for performing the actions specified by the lookup table 600 is given in FIG. 7. The medical claims management system is programmed to look up in the lookup table 610 the adjudication codes listed in the explanation of benefits. The action corresponding to the adjudication code will be performed by the system. If no adjudication with a Suspend action is encountered on the line item 620 and an adjudication code with a Transfer action is encountered on the same line item a Transfer 630 to next payer will be performed. If an adjudication code with a Write Off action is encountered 640 then a Write Off action is performed 650 by reducing the amount of the charge by the amount specified in the explanation of benefits. If an unfavorable adjudication exists for a line item 660, as specified by the Dny field in the lookup table then the line item will be added to the denial management queue 670. Because no action is taken for Null actions, the step of processing adjudication codes mapped to the Null action is not shown in FIG. 7.

In some embodiments the claims management system 30 may perform the further step of evaluating any partial payment to determine whether or not the partial payment is too low 680. In very many cases, partial payments are what is expected and accepted, such as when a proper capitation is taken, for example. But in other circumstances, the partial payment may be much lower than expected, and it will be advantageous to allow an operator to examine the circumstances of the partial payment. A variety of methods are available for evaluating whether a partial payment is satisfactory or unsatisfactory. A schedule of minimum satisfactory payments may be developed relating to a set of medical procedure codes included in the explanation of benefits. Analysis of payments and procedure codes is discussed in greater detail below. Also, a minimum satisfactory payment per generic charge may be set, such that, e.g., any payment below $50 will be held over for denial management. Additionally, limits could be placed on the amount of a charge that can be reduced in association with a given adjudication code without triggering denial management. For instance, a "Prompt-pay discount" (currently code 44, see Appendix A) is associated with a Write-Off action. But a limit could be set such that, e.g. more than 20% of a charge cannot be written off in association with this code. If a payment is unsatisfactory because it is lower than expected, the transaction is added to the denial management queue 690 and stored in association with the unique identifiers.

Because the explanation of benefits has described a payment there will also be a check associated with the payment, and so the additional step of verifying the deposits 700 can still be performed. The use of a unique identifier with each line item when the claim was submitted by the medical claims management system forces the payer to use the unique identifiers in the explanation of benefits. Thus, the medical claims management system 30 can unerringly identify and reliably examine all adjudications corresponding to each line item.

Figure 8:
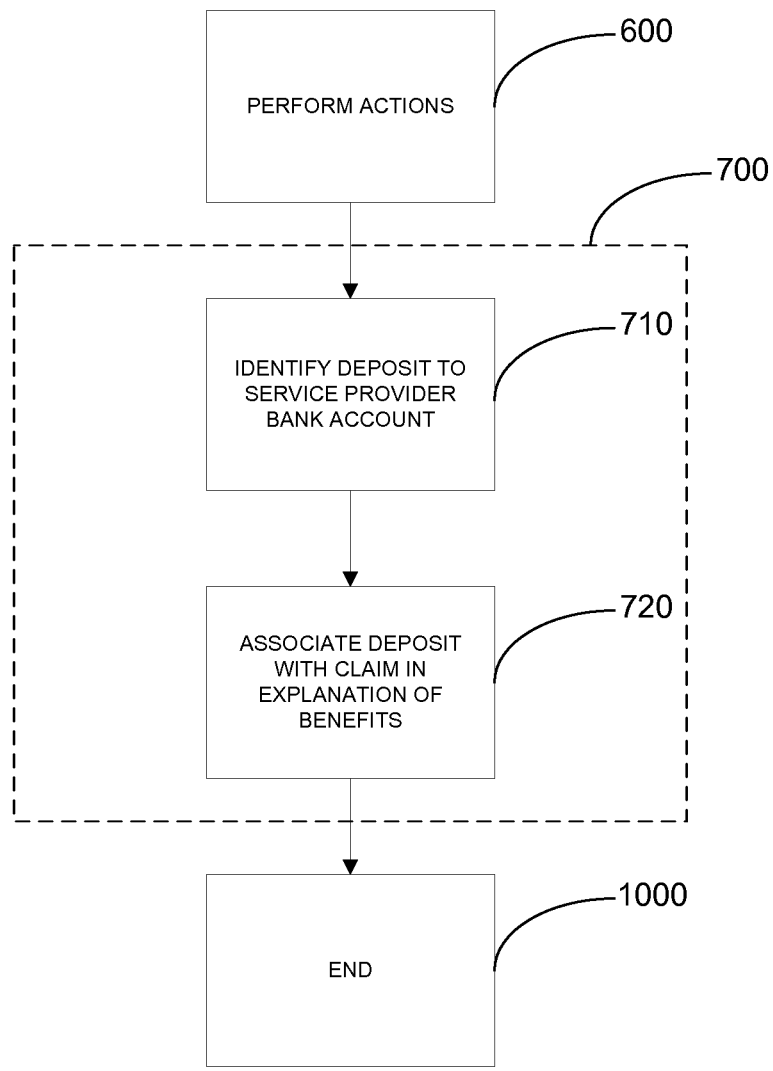
FIG. 8 is a flow chart of a deposit verification process in a medical claims management system in accordance with an embodiment of the present invention.

When an explanation of benefits provides information regarding amounts of payments assigned to line items, it also includes at least one check number. This check number can be used advantageously to verify that the payments described in the explanation of benefits have actually been received. It is further advantageous to perform the verification automatically, without the need for costly manual processing. A deposit verification process 700 in accordance with an embodiment of the present invention is now described with reference to FIG. 8. The medical claims management system 30 can be advantageously configured to identify deposits that are received in the health care service provider's bank account 710. One way of achieving this is to access the health care service provider's bank account transaction history over the network. The bank account transaction history may be displayed on a screen and processed with a screen scraper to extract the needed information. Once a deposit has been identified, it can be associated with a claim in an explanation of benefits 720 and recorded in the claims management system 30. This is preferably done by identifying a deposit and a payment to a claim in an explanation of benefits having the same associated check number. The system can notify a user periodically of the identified deposits. In an embodiment of the present invention, an electronic notification, such as an e-mail, text message, or electronic report accessible via an intranet portal, is delivered to the user every morning, describing all transactions that were processed the previous day. This allows the health care service provider to monitor payments received without ever having to query the bank account and without having to perform a tedious and costly process of manually examining the bank account transaction history and then manually entering each individual payment received into the claims management system 30. Once a deposit is received and verified, the line item in question exits this section of the dynamic processing flow according to an embodiment of the present invention 1000 to await static processing, such as statistical analysis or denial management.

Figure 9:
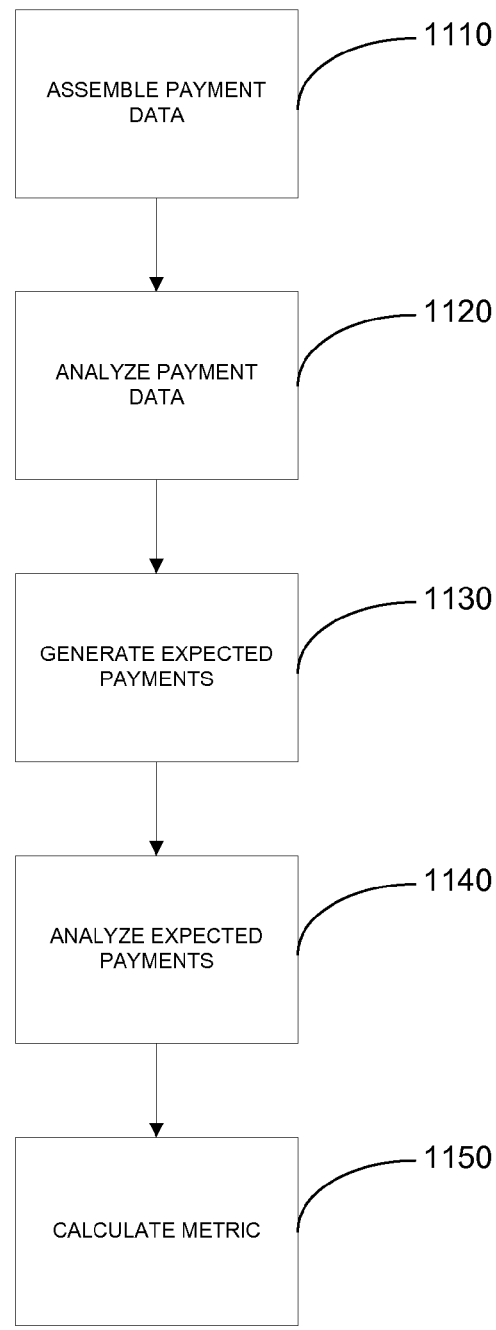
FIG. 9 is a flow chart of a statistical payment analysis process in a medical claims management system in accordance with an embodiment of the present invention.

One difficulty facing health care service providers is the inefficiency of the classical dispute resolution model, wherein if a health care service provider believes that a payer is consistently underpaying claims, it is not feasible for the health care service provider to appeal each individual underpayment, where the value of the individual underpayment may be very small, while the number of disputed transactions is very large. Therefore, it is advantageous to be able to track and analyze payment patterns over a great number of claims, such that a comprehensive analysis can be performed on the data as part of a settlement negotiation with a payer. Such a statistical payment analysis process in an embodiment of the present invention is now described with reference to FIG. 9. Payment data is assembled 1110 from a plurality of previously processed claims. Claims may be selected by date, payer, health care provider, medical procedure, and/or other data fields. From the claims, the data preferably contains a procedure code identifying for what medical procedure the charge was made. The data also preferably contains the amount paid by the payer associated with the procedure code. Because it is preferred that a very large volume of data is analyzed together, it is preferred to store the data in a relational database or data warehouse. In one embodiment of the present invention, a relational database is arranged according to a star schema. Use of star schema relational databases is known in the art to involve a space-time tradeoff, wherein greater redundancy is built into the data model, meaning that greater storage space is required, but processing of existing data entries is faster and easier. Because the present process does not involve the data entry process, this tradeoff is preferred as a method of decreasing processing times.

Having the payment data available in a star schema database, the payment data containing the unique identifiers associated with all transactions for the claims and their respective line items, it is now possible to analyze the payment data 1120 to determine long-term patterns. The claims or subsets of the claims may be viewed and analyzed according to data filters such as date ranges, procedure codes, doctor providing care, or any filter on any of the data fields represented in the payment data. In one embodiment, the history of a claim, i.e., its longitudinal record can be made accessible through a cross-tab (called a pivot table in EXCEL) so that the operator can click on an item and get the detail to pop up. In another embodiment of the present invention this analysis includes the step of calculating an average payment received from a payer in association with each procedure code. A set of expected payments is also generated 1130. According to an embodiment of the present invention, the expected payments may be generated using standard Medicare reimbursement values. The standard Medicare reimbursement values may be adjusted by an across-the-board premium factor, where, for example, a health care service provider could set the expected payments to be 110% of the Medicare schedule for each procedure code on the schedule. In another embodiment of the present invention, the expected payments could be generated from historical payment data relating to a payer. The payer may be a different payer from the payer represented in the payment data in 1110, or the payer could be the same payer, in which case the historical payment data would preferably relate to a different time period than the payment data in 1110. The expected payment data may then be analyzed 1140 to identify trends or anomalies. For example, historical payment data from a different payer could be compared to historical payment data from a third payer, or it could be compared to the Medicare schedule, and notable differences, such as specific procedure codes achieving significantly different average payments, could be recorded for further analysis. Once actual payment data and expected payment data have been assembled, generated, and individually analyzed, they may finally be analyzed together to calculate a metric 1150 relating the two data sets. In one embodiment of the present invention this metric may be a ratio between the actual payment data for a procedure code and the expected payment data for the procedure code. Other metrics could include, for example, a difference in total payment amounts between the two data sets, or a count of how many procedure codes are underperforming and overperforming compared to their expected payments. The results of this process can then be reported to the user in a variety of ways. The payment data and expected payment data may be displayed together with the calculated metric in a table or a graph. The report to the user could also be in the form of an alert, wherein the system periodically calculates the metrics and generates an alert whenever the metric relating to a particular procedure code falls outside a predetermined acceptable range. The alert could be in the form of an email, text message, etc.

Figure 10:
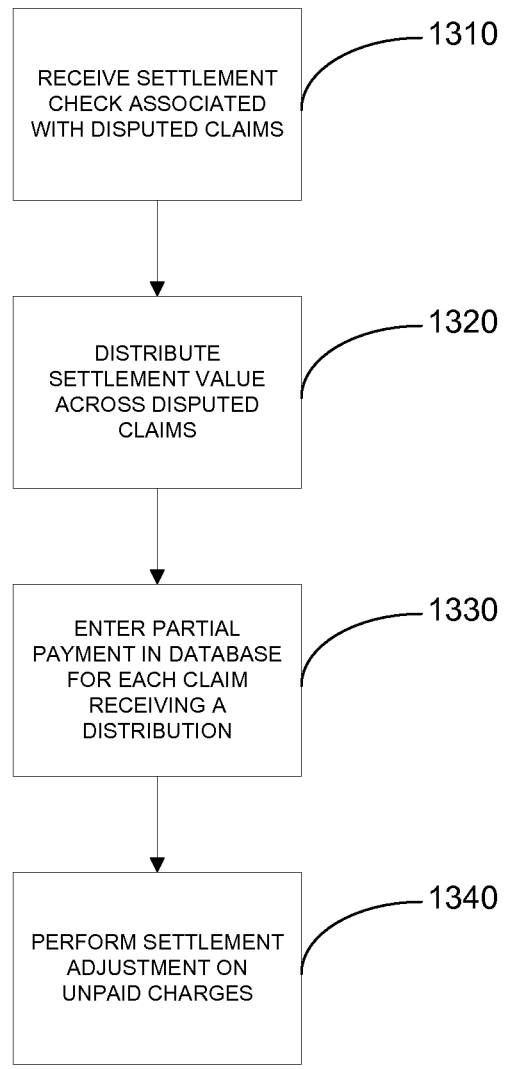
FIG. 10 is a flow chart of a settlement posting process in a medical claims management system in accordance with an embodiment of the present invention.

A settlement posting process in accordance with an embodiment of the present invention is now described with reference to FIG. 10. In some cases, a health care service provider may dispute a very large number of claim payments with a payer and successfully negotiate a settlement with the payer in resolution of all the disputed claims. For example, the statistical payment analysis process described above may be useful for this purpose, allowing the health care service provider to present the payer with the selected claims and the statistical analysis in support of a settlement campaign. In such a case, the health care service provider may receive a single check covering the entire settlement 1310. It is advantageous to be able to process this check and resolve the disputed claims automatically in accordance with the principles of this invention. We have seen that in the case where the claims management system 30 receives an explanation of benefits, the claims management system 30 can automatically process any associated checks and associate the payments with the proper claims and line items in the database. Because the system already has an electronic record from the statistical payment analysis process of what claims were disputed, it is possible to post these payments to the claims automatically. The system may also treat the value of the settlement check as if it were divided into individual payments to the individual claims covered by the settlement 1320. A user may select a rule for applying the settlement check to the claims. One rule the user may select includes dividing the value of the settlement check by the total outstanding value of all claims covered by the settlement, thereby calculating a ratio. That ratio may then be multiplied by the outstanding value of each relevant claim, and a payment can be made to the claim from the settlement check for that amount. Other rules could include applying a fixed amount, such as $10, to each claim. For each claim, the amount of the payment from the settlement check is applied to the outstanding charge as a partial payment 1330. Because the health care service provider has agreed to settle the claims with the payer, any unaccounted for remainder of the charge is then subject to a settlement adjustment 1340, and the claim is considered to be fully paid, with respect to the settling payer. The system may take further actions on the amounts receiving a settlement adjustment, including writing some or all of the amount off, or transferring some or all of the amount to a next payer, such as the patient. The fact that the charges are marked as having received a settlement adjustment 1340 will allow the Provider to recognize in the future that this line item received final adjudication through settlement negotiations, and thus the other, standard adjustment codes will not fully reflect the correct amounts that were paid and rejected.

Operators accessing the medical claims management system can get directly to any denied claims through the denial management queue. Many denials will be easily resolved by correcting data errors such as patient name, policy number, sex, date of birth or medical provider and the corrected charges can be automatically resubmitted to the insurer for payment, written off, transferred and billed to another payer, or voided and optionally re-entered as a new charge transaction directly from the denial management queue. Other claims will be determined to be incorrectly denied. Such denials may be collected and in aggregate and detail presented to the insurer along with the complete stored record of all actions taken by the insurer with respect to that claim. This longitudinal record that precisely mirrors the output of the payer system and contains what was paid, what was not paid, why, and when these events took place, all tied to the unique identifier of a denied line item charge, gives the clearinghouse or medical provider significant leverage in getting a nonpayment resolved more quickly. In the case of X12 electronic transactions, the actual files 997, 277 and 835 can be pulled up easily and presented to the payer showing a command of the information relevant to the claim denial. The true point of contention can be quickly focused upon making efficient resolution of the matter more likely.

Figure 14:
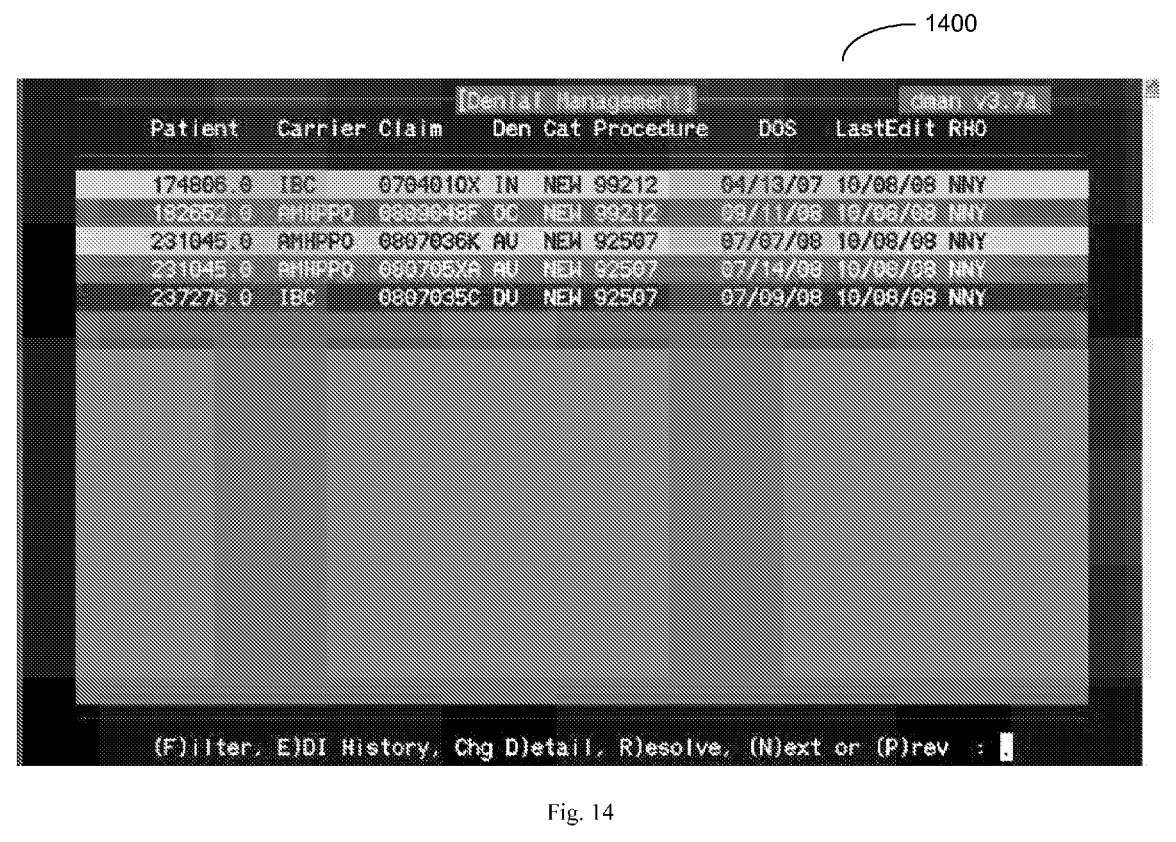
Figure 15:
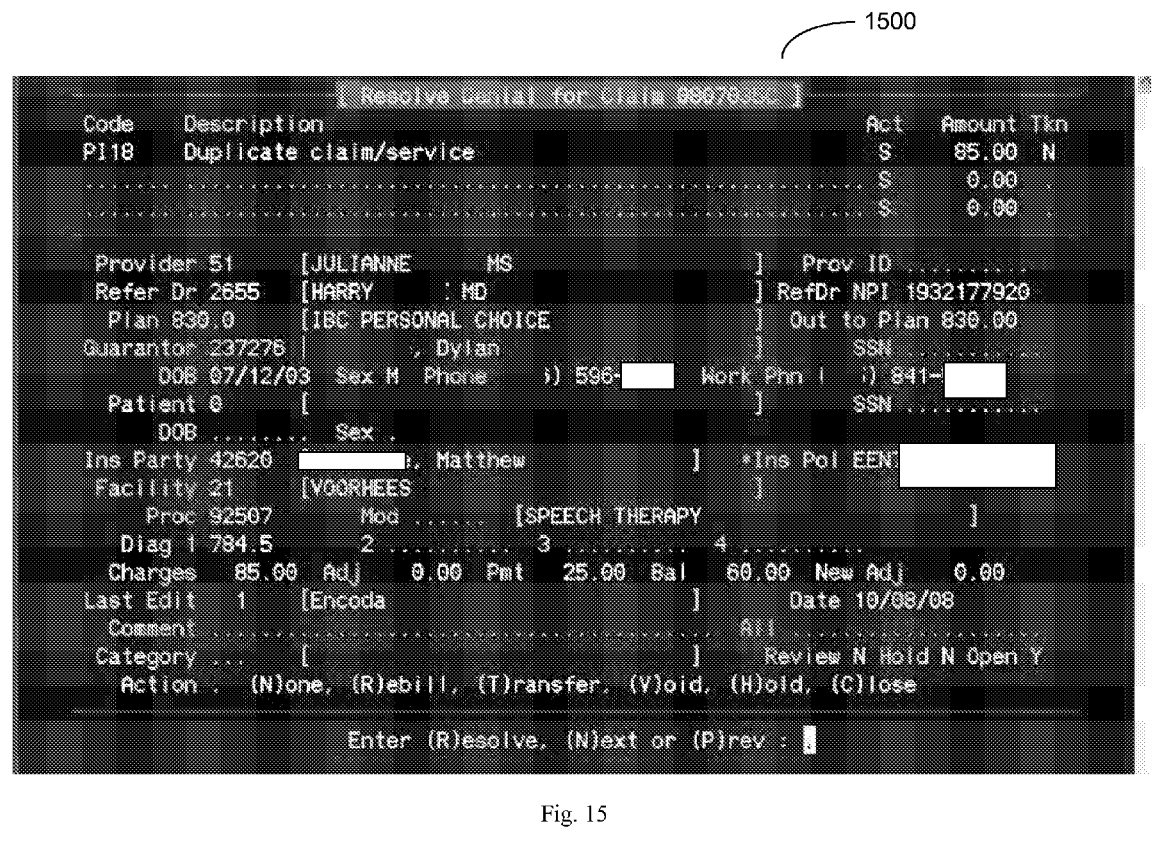

A denial management system is now described with reference to FIGS. 14-15. A denial management operator selects a plurality of line items. The plurality of line items may be selected by specifying any variety of data elements including, but not limited to, date range, payer, procedure codes, types of denials, status, denial category, etc. The denial management system presents the denial management operator with a screen showing the plurality of line items 1400. The denial management system allows the denial management operator to then select any particular one of the line items, and the denial management system provides a screen wherein data fields associated with the line item can be edited 1500. These fields may include, for example, provider NPI, referring doctor NPI, patient date of birth, patient SSN, patient insurance policy ID, etc. In one embodiment of the present invention, adjudication codes associated with the line item are associated with specific data fields, and only the associated data fields may be edited by the denial management operator through this screen 1500. The denial management operator may also change the status of the line item in the claims management system directly through the screen 1500. From this one screen, the denial management operator also may post a financial adjustment to the line item, transfer the line item to a different payer, rebill the line item, void and optionally reenter the line item, put the line item on hold, or push the line item to a supervisor for review.

Figure 11:
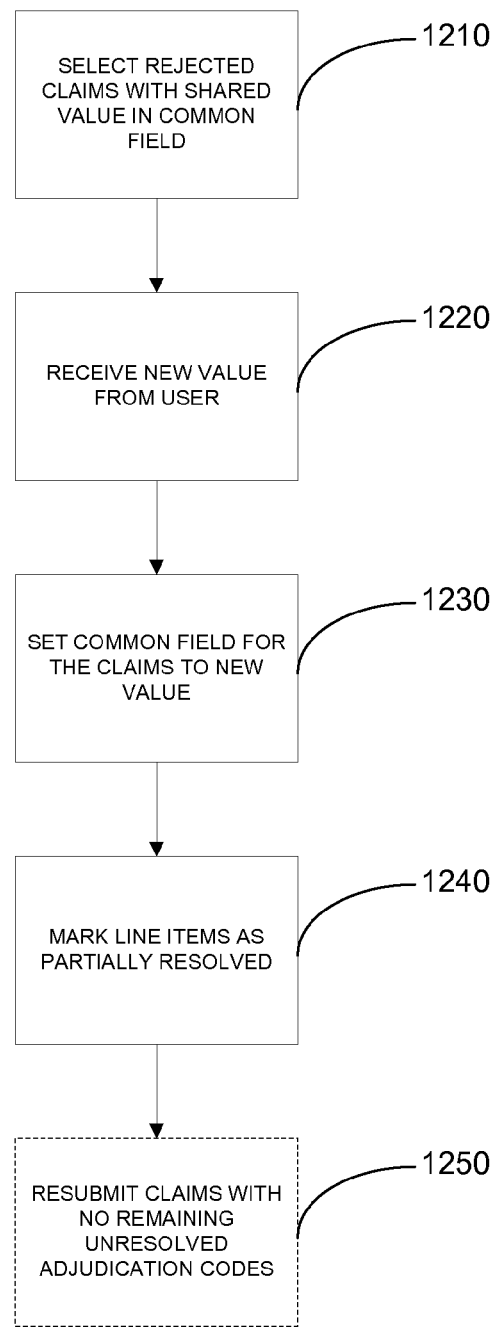
FIG. 11 is flow chart of a simultaneous claim resolution process in a medical claims management system in accordance with an embodiment of the present invention.

In some cases, a particular type of error will occur across many claims. For example, a policy number may be entered into the system incorrectly, leading to a series of rejected claims relating to an incorrect policy number. It is advantageous to be able to correct these kinds of errors quickly, without the need for an operator to manually fix the same error over and over. A process of simultaneous claim resolution in accordance with an embodiment of the present invention is now described with reference to FIG. 11. A plurality of rejected claims in the denial management queue may be automatically selected according to a shared value in a field 1210. The operator may then select a new value for the field 1220, such as the correct policy number in the above example. The claims management system 30 may then automatically edit the contents of the field in each of the rejected claims 1230 from the previous incorrect value to the new, user-defined value.

In many common cases, such as with incorrect demographic or insurance coverage information, the adjudication code associated with the line item can be associated with the data field that needs to be resolved. Partial resolutions from editing these data fields can then be associated with the appropriate adjudication codes. For example, an adjudication code may indicate that a diagnosis for a patient was inconsistent with the recorded gender of the patient. This adjudication code could thus be associated with the patient gender field. When the process above is used to edit the data field for patient gender, the system can then record that the related adjudication code has been addressed. If a line item no longer has any unaddressed adjudication codes, in some embodiments the system may be programmed to automatically resubmit 1250 the line item and/or its claim to the payer, without the need for human intervention. The edited line items are marked as partially resolved or in some other way to indicate that a change has been made. These items may remain in the denial management system for any further handling to complete their resolution.

Figure 12:
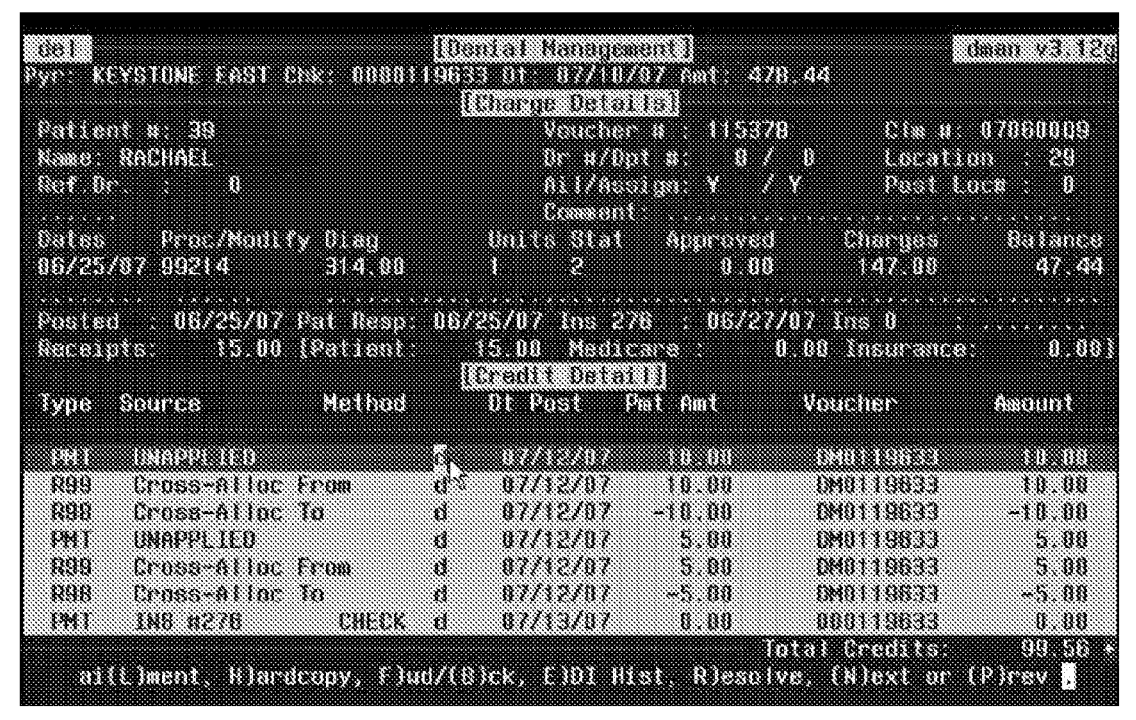

Referring now to FIG. 12, an example of a user interface displaying a portion of the longitudinal record for a given charge is shown. One can see in this screen shot, the record of payments unallocated and reallocated by the system. The system identified a mismatch between the line items to which the payer applied the co-payment and the line item to which the health care service provider applied the co-payment. The system unapplied the co-payment that was applied in the medical provider's system. In accordance with the allocation specified by the payer system, the medical claims management system took $10 from the patient account and reallocated it to the line item charge to which the payer had assigned the $10. The same unallocation and reallocation was applied to five dollars of the co-payment as per the allocation of that amount by the payer. One may scroll down through the remaining record to see the entire history of payments corresponding to the line item. As seen in the lower right, the total of credits from this record is $99.56. This leaves the balance shown in the screen of $47.44.

Figure 13:
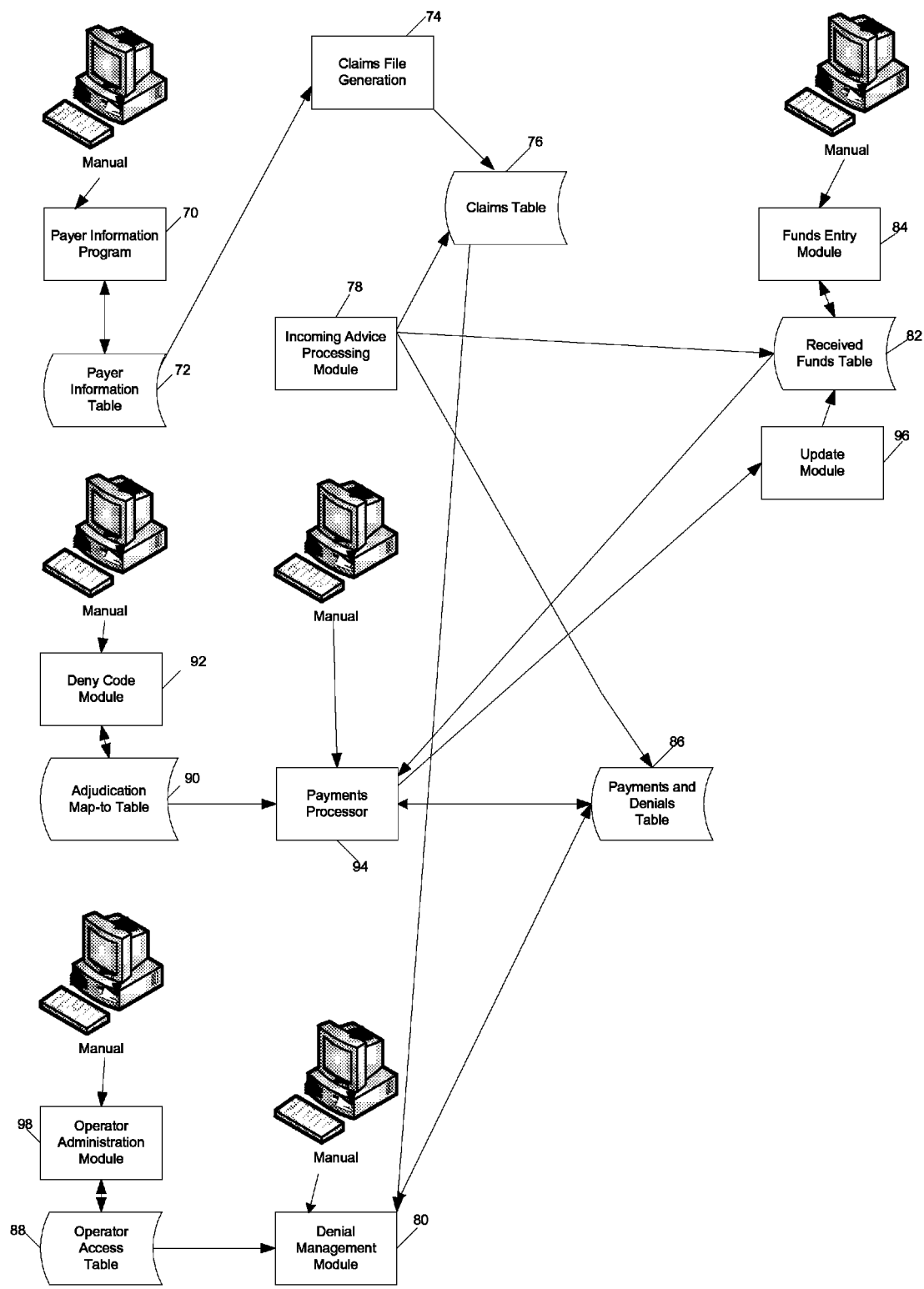
FIG. 13 is a schematic block diagram of a medical claims management system in accordance with an embodiment of the present invention.

To gain a greater understanding of the overall structure of the claims management system designed in accordance with principles of the present invention, we now turn to FIG. 13. The medical claims management system requires access to data identifying the payers with whom it will be communicating to request payments. An operator can enter payer information through an interface generated by a payer information program 70. Information regarding payers entered through the payer information program 70 is stored for access by the computer. The payer information may be stored in the form of a payer information table 72.

A claims file generation module 74 generates outgoing ANSI X12 837 files. The claims file generation module 74 has access to the payer information table 72 for retrieving information about the payer. This might include an IP address and other information that may be required. All electronic data interchange ("EDI") activity is logged into the claims table 76. Thus, a complete longitudinal record of all transactions relating to a claim or line item can be retrieved from the claims table 76. An outgoing file 837 file is made up of one or more claims, each claim having one or more line items of medical service charges. Aspects of the present invention make full use of the field CLM01 by including a unique identifier in this field to identify a claim. The ANSI X12 standard requires that the field CLM01 be maintained throughout the processing between payer and payee. Thus, even if later transactions otherwise lack sufficient application system information to associate a payment or a rejection with a claim, the CLM01 can serve the purpose of enabling the longitudinal record of transactions between the payee and payer to be stored and accessible with respect to any claim. In preferred embodiments, the unique identifier for CLM01 is created by the claims file generation module 74 as a combination of data including the claim number and any of the account information including account number, dataset identifying the payee, insurance policy number or other identifying data in a transaction. The CLM01 will, by force of the ANSI standard, be included in EDI from the payer so that the medical claims management system can then use the CLM01 to track and store responses to this claim.

In accordance with further aspects of the present invention, use is made of the REF6R field. The REF6R field is also required by the ANSI standard to be preserved in the course of processing the claims transactions. Thus, even if later transactions lack sufficient information to associate a payment or a rejection with a line item, the REF6R field can serve the purpose of enabling a longitudinal record of transactions between the payee and payer to be stored and accessible with respect to any line item. In preferred embodiments, the unique identifier for REF6R is created by the claims file generation module 74. The uniqueness of the REF6R id is determined by the health service provider's practice management system. In accordance with one embodiment, REF6R is a combination of the account number and a sequence number. In other embodiments, it may simply be a transaction or record number. The REF6R will, by force of the ANSI standard, be included in EDI from the payer so that a system can then use the REF6R to maintain a longitudinal record of all actions taken with respect to the line item.

In order to generate a claims file, the claims file generation module 74, needs access to the medical charges. These may be stored in a data set of a medical provider's computer system. The data set is not shown in the data flow for the medical claims management system. The medical claims management system is in connection with the health care service provider system 20. The claims files can be accessed and the data records of the provider can be amended to better conform with the payers' records for ease of resolving discrepancies.

An 837 claim submission file is generated with one or more claims. It has been found to be most efficient to post claims during the day while using evening hours for submitting the 837 to the payers, medical insurers typically. In accordance with ANSI X12, the computer systems of the medical insurers will respond to the 837 with an acknowledgement referred to as a file 997. The file 997 acknowledgement may include either an acceptance or a file level rejection.

Incoming transactions are received and handled by an incoming advice processing module 78. Rather than simply printing out a report of a rejection or preparing an image for display on a terminal and awaiting manual intervention, embodiments of the present invention make data records of the file 997s. The records are stored in a payments and denials table 86. Upon receiving a file level rejection, the claims file generation module 74 is instructed by the incoming advice processing module to re-generate a file 837 without the offending claims noted in the rejection. Thus, the 837 is automatically re-generated. The maintenance of the denial record and the resending of an 837 continues iteratively until an acceptance is received or all claims are removed. Thus, following a series of iterations beginning at the close of business, by morning the next day, the offending line items will wind up in a denial record for interactive electronic review by human operators. Such review takes place through the denial management module 80. The accepted file 837 claims data will enter the two-stage adjudication process at the payer.

Before completing adjudication, it is possible that the payer's computer system will send a file 277. The file 277 is a potential pre-adjudication denial. It typically relates to the patient insurance credentials. Perhaps the patient policy number, name or address has been misspelled or mistyped. Any such file 277 denials are received over the network by the incoming advice processing module 78, and recorded to a table for later interactive electronic review and processing in the denial management module 80. The file 277 denials are preferably stored in the payments and denials table 86, but in other embodiments may have their own table or find space within the claims table 76. Taking advantage of the fact that the ANSI standard requires the CLM01 field to be included in the file 277 denials, the 277 denials may be recorded by the incoming advice processing module 78 in the payment and denials table 86 in association with each of the included unique identifiers for the affected claims. Thus, embodiments of the invention do not lose track of any claims. The 277 will be retrievable for any claim that will go unpaid for a pre-adjudication reason.

Upon adjudicating a claim, a payer computer system generates a file 835. The file 835 is generally known as an explanation of benefits. It will include payments in whole or in part for certain line items and may include one or more reasons for partial or complete denial of other line items. One or more payments may be aggregated in a check. (As previously mentioned, a "check" as used herein relates to payments to be provided by electronic funds transfer or check or other commercially acceptable method including one or more of the payments in the 835.) The incoming advice processing module 78 receives the 835 and saves it to the claims table 76. Payments and denials are thus maintained in association with their associated CLM01 and REF6R.

The incoming advice processing module 78 stores a summary of the check information in a received funds table 82. The received funds table 82 maintains details as to how the check is distributed across multiple payees. The table details how much of the check has been posted. An operator may have access to received funds table 82 through a funds entry module 84. The operator may indicate which 835 checks have been deposited. The operator may further reconcile the check payment posting done automatically in the medical claims management system. The claims management system can be enhanced by further embodiments of the invention. Each night for example it can run a screen scraper program to review the bank account(s) of the health care service provider to identify all checks that were deposited that day through electronic funds transfer (EFT) or otherwise.

The individual payments in the 835 are stored by the incoming advice processing module 78 in the payments and denials table 86. The payments are marked with a status indicating whether or not the payment is ready for posting. If the status indicates the payment does not have an error and the check is indicated as being deposited in the received funds table 82 then the payment is ready for posting. When a settlement check is received, that also is entered in the payments and denials table 86 for processing. The amount of the settlement check is distributed across the claims, and the amounts distributed are marked as Settlement Adjustments as described previously.

In accordance with a further aspect of embodiments of the present invention, the incoming advice processing module 78 performs special handling for co-payments. As previously described, it is often the case that a patient visiting a health care service provider will make a payment by cash, credit card or check to the health care service provider for a portion of the medical treatment. This co-payment is required by the patient's health insurance policy. The health care service provider will receive the co-payment and apply it to one of the line item charges that comprise the treatment received by the patient. The line item selected by the staff at the health care service provider is often not the same as the line item to which the payer or health insurer applies the co-payment. The amounts are often not in agreement. In order to make discussions with the insurer more fluid, the incoming advice processing module 78 includes program code for inspecting the 835 and for any line item in the 835, reversing any patient payments or co-payments in the medical provider system. The patient credit for the co-payment goes into a temporary suspense account attributable to the patient. Then it reallocates the credit to the same line item to which the co-payment or payment was applied in the 835.

To simplify the tasks for the operators, the numerical codes used to represent an adjudication code are mapped into user-friendly translated codes or abbreviations as discussed above with regard to FIG. 4. The adjudication map-to table 90 contains the translated codes and actions associated with the adjudication codes. The map-to table is user programmable through a program referred to herein as the deny code module 92.

A payments processor 94 allows for manual processing of payments with an error status by assigning them to the correct charge or removing them. The automatic payment processing of the payments processor 94 will post payments, provided there is no error status on the payment and the payment check has been marked as deposited in the received funds table 82. The checks each have a control number that also appears in the 835 so that received funds can automatically be matched to the payments expected according to the 835. Moreover, given the unique identifiers for line items, the payments are automatically, through actions of the automatic payments processing program, associated with the line item charge(s) corresponding to the payment. An update module 96 automatically updates the received funds table with payment posting totals done by the automatic payments processing. Based on actions from the map-to table 90, the payments processor 94 may automatically perform Write-Offs and Transfers.

By maintaining a longitudinal record of all transactions pertaining to any claim or line item, wrongful claim denials can be more easily resolved. An operator reviews the denied claims through use of the denial management module 80. An administrator can control who has access to perform denial management with respect to a variety of factors, such as payee, payer or type of rejection. The access rights of each operator are given in an operator access table 88. The administrator enters data and adjusts rights through use of an operator administration module 98. The denial management module 80 allows an approved operator to review the entire history for a denied claim and determine if a correction can be made such that the claim can be resubmitted. Some denials may seem appropriate, in which case the operator can write off all or some portion of the charge, transfer the charge, rebill the charge, and close out the denial. Other denials may require pursuing a dispute with the initial payer. As to these, the longitudinal record of all transactions following the claim submissions through to the 835 responses will significantly help reach a resolution with the payer.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), a PC card (e.g., PCMCIA card), or other memory device. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable memory), a magnetic memory device (e.g., a diskette or fixed disk), an optical memory device (e.g., a CD-ROM), or other memory device. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The embodiments of the invention described above are intended to be merely exemplary; numerous variations and modifications will be apparent to those skilled in the art. All such variations and modifications are intended to be within the scope of the present invention as defined in any appended claims.

APPENDIX A

| Lvl | Code | Description | Den | Message | Act | Dny |
|---|---|---|---|---|---|---|
| 835 | 1 | Deductable Amount | DE | Deductible | T | N |
| 835 | 2 | Coinsurance Amount | CI | Coinsurance | T | N |
| 835 | 3 | Co-payment amount | CP | Copay | T | N |
| 835 | 4 | Procedure code inconsist/msng modifi | MD | Modifier | S | Y |
| 835 | 5 | Proc code/bill type inconsist place | PP | CPT/POS Mismatch | S | Y |
| 835 | 6 | Proc/rev code inconsist pat age | PA | CPT/Age Mismatch | S | Y |
| 835 | 7 | Proc code inconsistent patient gende | PS | CPT/Sex Mismatch | S | Y |
| 835 | 8 | Procedure code inconsist provide typ | PD | CPT/Prov Mismatch | S | Y |
| 835 | 9 | Diagnosis inconsist patient age | DA | Dx/Age Mismatch | S | Y |
| 835 | 10 | Diag inconsist w/sex | DS | DX/Sex Mismatch | S | Y |
| 835 | 11 | Diagnosis inconsist/proc. | DX | DX/CPT Mismatch | S | Y |
| 835 | 12 | Diag. inconsist provider type | PP | CPT/POS Mismatch | S | Y |
| 835 | 13 | Date of death procedes service | DT | Bad Dt Serv | S | Y |
| 835 | 14 | Date of birth follow date of service | DT | Bad Dt Serv | S | Y |
| 835 | 15 | Pmt adj msng/invld auth # or srv/pro | AU | Authorization | S | Y |
| 835 | 16 | Clm/serv lacks info for adjudication | IN | Incomplete Info | S | Y |
| 835 | 17 | Pmt adj requested info incomplete | IN | Incomplete Info | S | Y |
| 835 | 18 | Duplicate claim/service | DU | Duplicate Claim | S | Y |
| 835 | 19 | Clm deny/belongs worker's comp carri | OC | Other Coverage | S | Y |
| 835 | 20 | Clm deny covered by liability carrie | OC | Other Coverage | S | Y |
| 835 | 21 | Other coverage-no fault | OC | Other | S | Y |
| 835 | 22 | May be covered by another payer | OC | Other Coverage | S | Y |
| 835 | 23 | Pmt adj prior payer adjudication & a | AP | Adjudication Prior | S | Y |
| 835 | 24 | Pmt/chrgs adj under capitation agree | CT | Capitation | W | N |
| 835 | 25 | Pmt denied deductible not met | DE | Deductible | T | N |
| 835 | 26 | Expense incurred prior to coverage | OT | Outside Term | S | Y |
| 835 | 27 | Expense incurred after coverage term | OT | Outside Term | T | N |
| 835 | 29 | Time limit for filing expired | TF | Timely filing | S | Y |
| 835 | 31 | Clm denied patient not our insured | NC | CPT or Pat Not Cove | S | Y |
| 835 | 32 | Not eligible dependent as defined | NC | CPT or Pat Not Cove | S | Y |
| 835 | 33 | Clm demied. On dependent coverage | NC | CPT or Pat Not Cove | S | Y |
| 835 | 34 | Clm denied. No coverage for newborn | NC | CPT or Pat Not Cove | S | Y |
| 835 | 35 | Lifetime benefit max reached | MB | Maximum Benefits | T | N |
| 835 | 38 | Srv not provide/auth designated prov | NA | Not Auth Provider | S | Y |
| 835 | 39 | Srv denied at time auth/pre-cert req | AU | Authorization | S | Y |
| 835 | 40 | Chrgs don't meet qualif for urgent c | NU | Not Urgent | S | Y |
| 835 | 42 | Chrgs exceed fee or max allow (CARC4 | CA | Contractual Adj | W | N |
| 835 | 44 | Prompt-pay discount | DI | Discount | W | N |
| 835 | 45 | Chrgs exceed contract chg effectv6/1 | CA | Contractual Adj | W | N |
| 835 | 47 | Diagnosis not covered, missing, or i | IN | Incomplete Info | S | N |
| 835 | 49 | Srv not cov in conjunction routine ex | NC | CPT or Pat Not Cove | S | Y |
| 835 | 50 | Srv not covered no med necessity | MN | Medical Necessity | S | Y |
| 835 | 51 | Pre-existing condition not covered | PE | Pre Existing | S | Y |
| 835 | 52 | Refer/rend prov not elig to refer | CM | Contract Matter | S | Y |
| 835 | 53 | Srv relative/member household not co | NC | CPT or Pat Not Cove | S | Y |
| 835 | 54 | Multiple DR/assist not covd this cas | NC | CPT or Pat Not Cove | S | Y |
| 835 | 55 | Clm/srv deny experimental treatment | NC | CPT or Pat Not Cove | S | Y |
| 835 | 56 | Clm/srv denied treat deemed ineffect | NC | CPT or Pat Not Cove | S | Y |
| 835 | 57 | Pmt deny/reduce doesn't support srv | HZ | Frequency Violation | S | Y |
| 835 | 58 | Pmt adj serv rendered invalid place | PP | CPT/POS Mismatch | S | Y |
| 835 | 59 | Reduced-mult.surg.rules | DM | Deduct Multi Procs | W | Y |
| 835 | 60 | Chrgs outpat close to inpat not covd | NC | CPT or Pat Not Cove | S | Y |
| 835 | 61 | Chrgs adj penalty no second opinion | SO | Need 2nd Opinion | S | Y |
| 835 | 62 | Pmt deny/reduce absence pre-cert/aut | AU | Authorization | S | Y |
| 835 | 63 | Correction to a prior claim | AC | Accounting Issue | S | Y |
| 835 | 64 | Denial reversed per med review | ~ | Refer to Adjud Code | N | N |
| 835 | 65 | Wrong proc code pmt reflect corect c | ~ | Refer to Adjud Code | S | Y |
| 835 | 66 | Blood Deductible | ~ | Refer to Adjud Code | W | Y |
| 835 | 67 | Lifetime reserv days(Handled QTY01 = L | ~ | Refer to Adjud Code | S | Y |
| 835 | 68 | DRG weight, (Handled in CLP12) | ~ | Refer to Adjud Code | N | N |
| 835 | 69 | Day outlier amount | ~ | Refer to Adjud Code | S | Y |
| 835 | 70 | Cost outlier - adj compensate added | ~ | Refer to Adjud Code | S | Y |
| 835 | 71 | Primary Payer amount | ~ | Refer to Adjud Code | N | N |

APPENDIX A-continued

| Lvl | Code | Description | Den | Message | Act | Dny |
|---|---|---|---|---|---|---|
| 835 | 72 | Coinsure day. (Handled QTY01 = CD) | CI | Coinsurance | T | Y |
| 835 | 73 | Administrative Days | ~ | Refer to Adjud Code | N | N |
| 835 | 74 | Indirect Med education adj | ~ | Refer to Adjud Code | S | Y |
| 835 | 75 | Direct Med education adj | ~ | Refer to Adjud Code | S | Y |
| 835 | 76 | Disproportionate share adj | ~ | Refer to Adjud Code | S | Y |
| 835 | 77 | Covered days. (Handled QTY01 = CA) | PB | Plan Benefits | S | Y |
| 835 | 78 | Non-covered days/room chrg adj | ~ | Refer to Adjud Code | S | Y |
| 835 | 79 | Cost report days (Handled in MIA15) | ~ | Refer to Adjud Code | N | N |
| 835 | 80 | Outlier days. (Handled QTY01 = OU | ~ | Refer to Adjud Code | N | N |
| 835 | 81 | Discharges | ~ | Refer to Adjud Code | N | N |
| 835 | 82 | PIP days | ~ | Refer to Adjud Code | N | N |
| 835 | 83 | Total visits | ~ | Refer to Adjud Code | N | N |
| 835 | 84 | Capital adj (Handled in MIA) | AC | Accounting Issue | S | Y |
| 835 | 85 | Int amount. Chng effect 1/1/08(code | IA | Interest Amount | S | Y |
| 835 | 86 | Statutory adjustment | ~ | Refer to Adjud Code | N | N |
| 835 | 87 | Transfer amount | AC | Accounting Issue | S | Y |
| 835 | 88 | Adj represnts colect recv prior over | PO | Paid Other Provider | S | Y |
| 835 | 89 | Prof fees removed from chrgs | ~ | Refer to Adjud Code | S | Y |
| 835 | 90 | Ingredient cost adjustment | ~ | Refer to Adjud Code | S | Y |
| 835 | 91 | Dispensing fee adjustment | ~ | Refer to Adjud Code | S | Y |
| 835 | 92 | Claim paid in full | ~ | Refer to Adjud Code | N | N |
| 835 | 93 | No claim level adjustments | ~ | Refer to Adjud Code | N | N |
| 835 | 94 | Processed in Excess of chrgs | CA | Contractual Adj | W | N |
| 835 | 95 | Bene adj.Plan proc not followed | PB | Plan Benefits | S | Y |
| 835 | 96 | Non-covered chrgs use remark code | NC | CPT or Pat Not Cove | S | Y |
| 835 | 97 | Pmt adj bene includ in adjudicated p | PI | Pmt Made to Othr It | S | Y |
| 835 | 98 | HOSP clm Medicare inpat non-Dr srv | ~ | Refer to Adjud Code | S | Y |
| 835 | 99 | Medicare secondary payer adj amount | ~ | Refer to Adjud Code | S | N |
| 835 | 100 | Pmt made to patient | PT | Pmt Made to Patient | T | N |
| 835 | 101 | Predeterm; Pmt of srv | EF | Early Filing | S | Y |
| 835 | 102 | Major Medical Adjustment | CA | Contractual Adj | W | N |
| 835 | 103 | Provider Promo discount | DI | Discount | W | N |
| 835 | 104 | Managed care withholding | WH | Withholding | S | Y |
| 835 | 105 | Tax withholding | WH | Withholding | S | Y |
| 835 | 106 | Pat pmt not in effect | ~ | Refer to Adjud Code | S | Y |
| 835 | 107 | Related srv not on clm | IN | Incomplete Info | S | Y |
| 835 | 108 | Guidlines not met | ~ | Refer to Adjud Code | S | Y |
| 835 | 109 | Incorrect payer | OC | Other Coverage | S | Y |
| 835 | 110 | Bill date predates dos | DT | Bad Dt Serv | S | Y |
| 835 | 111 | Not cov unless p.a.a. | AS | Needs Assignment | S | Y |
| 835 | 112 | Pmt adj not dir patient | ~ | Refer to Adjud Code | S | Y |
| 835 | 113 | Pmt deny proc out USA. | ~ | Refer to Adjud Code | S | Y |
| 835 | 114 | Not approve FDA procedure | ~ | Refer to Adjud Code | S | Y |
| 835 | 115 | Deny pmt procedure cxl | ~ | Refer to Adjud Code | S | Y |
| 835 | 116 | Pmt deny did not comply req | IN | Incomplete Info | S | Y |
| 835 | 117 | Trans.cvrd.closest facility | ~ | Refer to Adjud Code | S | Y |
| 835 | 118 | Chrg reduce ESRD net supprt | ~ | Refer to Adjud Code | S | Y |
| 835 | 119 | Max. benefit has been met | MB | Maximum Benefits | S | N |
| 835 | 120 | Cvrd. by mange care plan | OC | Other Coverage | S | Y |
| 835 | 121 | Indemnification adjustment | CA | Contractual Adj | S | Y |
| 835 | 122 | Psychiatric reduction | PB | Plan Benefits | S | Y |
| 835 | 123 | Payer refund overpaid | AC | Accounting Issue | S | Y |
| 835 | 124 | Payor refund not our patient | NC | CPT or Pat Not Cove | S | Y |
| 835 | 125 | PMT adj due to sub/bill error | ~ | Refer to Adjud Code | S | Y |
| 835 | 126 | Deductable- Major Medidcal | DE | Deductible | T | N |
| 835 | 127 | Co-ins- Major medical | CI | Coinsurance | T | N |
| 835 | 128 | Newborn covered w/mom allowance | NS | Newborn Services | S | Y |
| 835 | 129 | Pmt deny prior info wrong | IN | Incomplete Info | S | Y |
| 835 | 130 | Claim submission fee | ~ | Refer to Adjud Code | S | Y |
| 835 | 131 | Clm specific discount negotable | ~ | Refer to Adjud Code | S | Y |
| 835 | 132 | Prearranged demo proj adj | ~ | Refer to Adjud Code | S | Y |
| 835 | 133 | Pend review dispositon clm/service | FR | Pendin Furthr Revie | S | Y |
| 835 | 134 | Technical fees removed from charges. | ~ | Refer to Adjud Code | S | Y |
| 835 | 135 | Interim bills can't be processed. | IB | Interim Bills Denie | S | Y |
| 835 | 136 | Clm adj. fail prior payer cov rules | ~ | Refer to Adjud Code | S | Y |
| 835 | 137 | Pmt/Reduce for Reg Surchrgs, Asses | ~ | Refer to Adjud Code | S | Y |
| 835 | 138 | Clm/srv deny Appeal procedures not f | AI | Administrative Issu | S | Y |
| 835 | 139 | Contract fund agree Subscriber emplo | AI | Administrative Issu | S | Y |
| 835 | 140 | Patient health ID # & name no match | ID | ID/Name Conflict | S | Y |
| 835 | 141 | Claim spans elig/inelig period | EL | Eligibility Issue | S | Y |
| 835 | 142 | Monthly Medicaid patient liability | DE | Deductible | T | Y |
| 835 | 143 | Portion of payment deferred. | AC | Accounting Issue | S | Y |
| 835 | 144 | Incentive adj, e.g. prefer prod/srv | ~ | Refer to Adjud Code | S | Y |
| 835 | 145 | Premium payment withholding | AC | Accounting Issue | S | Y |
| 835 | 146 | Pmt denied dx invalid dos | DD | DX/Date Mismatch | S | Y |
| 835 | 147 | Prov contract/nego rate expire no fi | CM | Contract Matter | S | Y |

APPENDIX A-continued

| Lvl | Code | Description | Den | Message | Act | Dny |
|---|---|---|---|---|---|---|
| 835 | 148 | Clm/srv rej info other prov incomple | IN | Incomplete Info | S | Y |
| 835 | 149 | Life bene max reachd for category | MB | Maximum Benefits | T | N |
| 835 | 150 | Pmt adj info do not supt level servi | IN | Incomplete Info | S | Y |
| 835 | 151 | Pmt adj payer info subit dont supt s | IN | Incomplete Info | S | Y |
| 835 | 152 | Pmt adj payr info submt don't supt L | IN | Incomplete Info | S | Y |
| 835 | 153 | Pmt adj payr info don't supt dosage | IN | Incomplete Info | S | Y |
| 835 | 154 | Pmt adj payr info don't supt supply | IN | Incomplete Info | S | Y |
| 835 | 155 | Clm denied patient refused serv/proc | IN | Incomplete Info | S | Y |
| 835 | 156 | Flexible spending account payments | ~ | Refer to Adjud Code | S | Y |
| 835 | 157 | Pmt denied/reduc srv/proc act of War | ~ | Refer to Adjud Code | S | Y |
| 835 | 158 | Pmt deny/reduce provided out of USA | NC | CPT or Pat Not Cove | S | Y |
| 835 | 159 | Pmt deny/reduced serv/proc Terroris | NC | CPT or Pat Not Cove | S | Y |
| 835 | 160 | Pmt deny/reduce injury/ill excluded | NC | CPT or Pat Not Cove | S | Y |
| 835 | 161 | Provider performance bonus | AI | Administrative Issu | S | Y |
| 835 | 162 | State-mandated Requirement for Prope | ~ | Refer to Adjud Code | S | Y |
| 835 | 163 | Clm/srv adj attach not received | AT | Need Attachment | S | Y |
| 835 | 164 | Clm/Srv adj attach ref not timely | TF | Timely filing | S | Y |
| 835 | 165 | Pmt deny/reduced absence/exceed refe | AU | Authorization | S | Y |
| 835 | 166 | Srv submit aft responsibil to pay en | TF | Timely filing | S | Y |
| 835 | 167 | Diagnosis(es) is (are) not covered. | DX | DX/CPT | S | Y |
| 835 | 168 | Pmt deny cov med plan not dental | PC | Provider Credential | S | Y |
| 835 | 169 | Pmt adj alternate benefit provided | AL | Alternative Procedu | S | Y |
| 835 | 170 | Pmt is denied when this type of prov | PC | Provider Credential | S | Y |
| 835 | 171 | Pmt is denied when this type of fac | PC | Provider Credential | S | Y |
| 835 | 172 | Pmt is adj when prov w/ this special | PC | Provider Credential | S | Y |
| 835 | 173 | Pmt adj service not prescribed by Dr | ~ | Refer to Adjud Code | S | Y |
| 835 | 174 | Pmt deny srv not prescribe prior 2 d | AU | Authorization | S | Y |
| 835 | 175 | Pay deny prescription is incomplete | AU | Authorization | S | Y |
| 835 | 176 | Pay deny prescription isn't current | AU | Authorization | S | Y |
| 835 | 177 | Pay deny pat not met elig require | NC | CPT or Pat Not Cove | S | Y |
| 835 | 178 | Pmt adj pat not met spend down req | ~ | Refer to Adjud Code | S | Y |
| 835 | 179 | Pmt adj pat not met waiting require | HZ | Frequency Violation | S | Y |
| 835 | 180 | Pmt adj pat not met residency requir | ~ | Refer to Adjud Code | S | Y |
| 835 | 181 | Pmt adj proc code invld date srv | NC | CPT or Pat Not Cove | S | Y |
| 835 | 182 | Pmt adj proc mod invld date srv | MD | Modifier | S | Y |
| 835 | 183 | Provr not elig to refer srv billed | ~ | Refer to Adjud Code | S | Y |
| 835 | 184 | Prov/prescribe not elig srv billed | PC | Provider Credential | S | Y |
| 835 | 185 | Render prov not elig srv billed | PC | Provider Credential | S | Y |
| 835 | 186 | Pmt adj since level of care chngd | RL | Reduced Level Serv | S | Y |
| 835 | 187 | Health Savings account payments | HS | Health Savings Paym | S | Y |
| 835 | 188 | Cov when used accordg to FDA recomme | NC | CPT or Pat Not Cove | S | Y |
| 835 | 189 | Not otherwise classfy/unlistd proc c | NC | CPT or Pat Not Cove | S | Y |
| 835 | 190 | Pmt is included in allowance SNF sta | ~ | Refer to Adjud Code | S | Y |
| 835 | 191 | Clm denied not worker's compensation | OC | Other Coverage | S | Y |
| 835 | 192 | Non std adj code from paper rem advi | ~ | Refer to Adjud Code | S | Y |
| 835 | 193 | Orig pmt decis is OK. Clm prop 1st t | AD | Appeal Denied | S | Y |
| 835 | 194 | Pmt adj when anesthesia is giv atnd | ~ | Refer to Adjud Code | S | Y |
| 835 | 195 | Pmt deny/reduced refund issued bad p | AI | Administrative Issu | S | Y |
| 835 | 196 | Clm/srv deny prior payer cov determi | AI | Administrative Issu | S | Y |
| 835 | 197 | Precertification/authorization/notif | AU | Authorization | S | Y |
| 835 | 202 | Non covered personal comfort or conv | NC | CPT or Pat Not Cove | S | Y |
| 835 | 204 | Svc/equipment/drug not covered under | PB | Plan Benefits | T | N |
| 835 | A0 | Patient refund amount | ~ | Refer to Adjud Code | S | N |
| 835 | A1 | Clm denied needs a remark code | NC | CPT or Pat Not Cove | S | Y |
| 835 | A2 | Contractual adjustment | CA | Contractual Adj | W | N |
| 835 | A3 | Medicare secondary payer liability m | ~ | Refer to Adjud Code | N | N |
| 835 | A4 | Medicare clm PPS Cap day outlier amo | ~ | Refer to Adjud Code | S | Y |
| 835 | A5 | Medicare clm PPS cap cost outlier am | ~ | Refer to Adjud Code | S | Y |
| 835 | A6 | Prior HOSP or 30 day xfr req not met | HZ | Frequency Violation | S | Y |
| 835 | A7 | Presumptive payment adj | CA | Contractual Adj | S | Y |
| 835 | A8 | Clm denied; ungroupable DRG | NC | CPT or Pat Not Cove | S | Y |
| 835 | B1 | Non-covered visits | NC | CPT or Pat Not Cove | S | Y |
| 835 | B10 | Allow amount reduced part of test pa | NC | CPT or Pat Not Cove | S | Y |
| 835 | B11 | Transfr to payer clm/serv not covere | OC | Other Coverage | S | Y |

APPENDIX A-continued

| Lvl | Code | Description | Den | Message | Act | Dny |
|---|---|---|---|---|---|---|
| 835 | B12 | Service not recorded in medical reco | ND | Not Documntd in Chr | S | Y |
| 835 | B13 | Pmt for clm/serv previously paid | DU | Duplicate Claim | S | Y |
| 835 | B14 | Pmt denied 1 visit per/Dr/day covere | PB | Plan Benefits | S | Y |
| 835 | B15 | Proc not paid seperately needs adjud | NC | CPT or Pat Not Cove | S | Y |
| 835 | B16 | Pmt adj new patient req not met | IN | Incomplete Info | S | Y |
| 835 | B17 | Pmt adj prescription not by physicia | ~ | Refer to Adjud Code | N | N |
| 835 | B18 | Pmt adj proc/modifier invld date srv | NC | CPT or Pat Not Cove | S | Y |
| 835 | B19 | Clm/serv adj finding review org | NC | CPT or Pat Not Cove | S | Y |
| 835 | B2 | Covered visits | PB | Plan Benefits | S | Y |
| 835 | B20 | Pmt adj part cov by other provider | PB | Plan Benefits | S | Y |
| 835 | B21 | Chrgs reduced part by other provider | PB | Plan Benefits | S | Y |
| 835 | B22 | Pmt adj based on diagnosis | DX | DX/CPT Mismatch | S | Y |
| 835 | B23 | Pmt deny prov failed prof test progr | PC | Provider Credential | S | Y |
| 835 | B3 | Covered charges | ~ | Refer to Adjud Code | N | N |
| 835 | B4 | Late filing penalty | TF | Timely filing | S | Y |
| 835 | B5 | Pmt adj cov/program guide not met | PB | Plan Benefits | S | Y |
| 835 | B6 | Pmt adj when perform this prov type | ~ | Refer to Adjud Code | N | N |
| 835 | B7 | Provider not cert/elig/date of servi | NA | Not Auth Provider | S | Y |
| 835 | B8 | Clm/srv not covrd. Alternt avail/uti | AL | Alternative Procedu | S | Y |
| 835 | B9 | Serv not covered pa. enrolled Hospic | PB | Plan Benefits | S | Y |
| 835 | D1 | Clm/serv deny subluxation msng/inade | IN | Incomplete Info | S | Y |
| 835 | D10 | Clm/srv deny. Fin relation frm not f | ~ | Refer to Adjud Code | N | N |
| 835 | D11 | Clm msng complete pacemaker reg form | IN | Incomplete Info | S | Y |
| 835 | D12 | Clm/srv deny does not ID prov or amo | IN | Incomplete Info | S | Y |
| 835 | D13 | Clm/serv Dr. has financial interest | ~ | Refer to Adjud Code | N | N |
| 835 | D14 | Clm lacks ID that plan/treatment on | IN | Incomplete Info | S | Y |
| 835 | D15 | Clm lacks ID of supervision of servi | IN | Incomplete Info | S | Y |
| 835 | D16 | Clm lacks prior payer pay info. | IN | Incomplete Info | S | Y |
| 835 | D17 | Clm/serv has invalid non-covered day | IN | Incomplete Info | S | Y |
| 835 | D18 | Clm/srv has msng diagnosis info. | IN | Incomplete Info | S | Y |
| 835 | D19 | Clm/srv lacks Dr/operatv/other supt | AT | Need Attachment | S | Y |
| 835 | D2 | Clm lacks name/stregth/dose of drug | IN | Incomplete Info | S | Y |
| 835 | D20 | Clm/srv msng srv/product info. | IN | Incomplete Info | S | Y |
| 835 | D21 | Diagnosis(es) is missing/invalid | IN | Incomplete Info | S | Y |
| 835 | D3 | Clm/srv deny info patient owns equip | IN | Incomplete Info | S | Y |
| 835 | D4 | Clm/srv time period needed not indic | IN | Incomplete Info | S | Y |
| 835 | D5 | Clm/srv deny lacks individual lab co | IN | Incomplete Info | S | Y |
| 835 | D6 | Clm/srv deny needs med records for s | IN | Incomplete Info | S | Y |
| 835 | D7 | Clm/srv deny needs recent visit date | IN | Incomplete Info | S | Y |
| 835 | D8 | Clm/srv deny lacks indicator XRay re | IN | Incomplete Info | S | Y |
| 835 | D9 | Clm/srv deny needs invoice cost of I | IN | Incomplete Info | S | Y |
| 835 | EC1 | Reverse Entry by Ins | NO | Nonspecifc Rejectio | S | Y |
| 835 | EC2 | Nonspecific Rej (0 Pmt w/no explane) | NO | Nonspecifc Rejectio | S | Y |
| 835 | EN1 | Reverse entry by ins | NO | Nonspecifc Rejectio | S | Y |
| 835 | EN2 | non-specific rejection | NO | Nonspecifc Rejectio | S | Y |
| 835 | W1 | W/Comps State Fee Schedule Adj | CA | Contractual Adj | W | N |

What is claimed is:

1. A computerized method of managing requests by a health care service provider for payment, the method including processes, performed by a computer system operated on behalf of the provider, comprising:

for each claim in a set of multiple claims, generating, by the computer system operated on behalf of the provider, a first unique identifier, associated with such claim, and a second unique identifier associated with each line item of the claim;

assembling, by the computer system operated on behalf of the provider, the set of multiple claims into a single electronic file of the provider for submission to a computer system operated on behalf of a payer, in a manner that such that, for each claim in the file there is provided (i) the first unique identifier, associated with such claim, in a field required by standards to be preserved during processing by a computer system operated on behalf of the payer and (ii) the second unique identifier associated with each line item of the claim, wherein the second identifier is distinct for each line item;

causing electronic transmission, by the computer system operated on behalf of the provider, of the electronic file of the provider over a network to the computer system operated on behalf of the payer, wherein the transmitted electronic file constitutes a submission of the claims to the payer for processing by the payer;

receiving, over the network, by the computer system operated on behalf of the provider, in electronic form, from the computer system operated on behalf of the payer, a set of explanation of benefits records that are responsive to claims in the electronic file of the provider, in such a manner that each explanation of benefits record responsive to a given claim contains (i) the first unique identifier corresponding to the given claim from the electronic file of the provider, and (ii) the second unique identifier associated with each line item of the given claim;

for each explanation of benefits record received from the payer, storing, by the computer system operated on behalf of the provider, the explanation of benefits record in association with its corresponding first unique identifier;

in connection with any transaction involving an unfavorable adjudication by the payer, of a line item of a selected claim, storing, by the computer system operated on behalf of the provider, as denial data the transaction in association with the second unique identifier for the unfavorably adjudicated line item of the selected claim; and retrieving, by the computer system operated on behalf of the provider, the stored denial data, in conjunction with corresponding line item data, to provide an electronic denial management output, for use by the provider in responding to the payer.

2. The computerized method of claim 1, wherein each explanation of benefits record further contains:
for each line item to which the payer applied a patient payment, a patient payment allocation;
the processes of the method further comprising:
reversing any patient payment allocation in the computer system operated on behalf of the provider for any line item referenced in the explanation of benefits record; and
re-allocating the patient payment in the computer system operated on behalf of the provider to the line item to which the patient payment was allocated in the explanation of benefits record.

3. The computerized method of claim 1, wherein each explanation of benefits record further contains:
for each line item to which the payer applied a patient payment, a patient payment allocation;
the processes of the method further comprising:
comparing, by the computer system operated on behalf of the provider, the line item to which a patient payment is allocated in the explanation of benefits record and the line item to which the health care service provider allocated the patient payment;
reversing the patient payment allocation in the computer system operated on behalf of the provider if the line item allocations are not the same; and
re-allocating the patient payment in the computer system operated on behalf of the provider to the line item to which the patient payment was allocated in the explanation of benefits record.

4. The computerized method of claim 1, wherein each explanation of benefits record further contains:
a set of adjudication codes for each line item, wherein each adjudication code of the line item relates to a portion of the associated charge;
the processes, by the computer system operated on behalf of the provider, of the method further comprising:
for each line item referenced in the explanation of benefits record, looking up the adjudication codes in a table of associated actions;
if any actions associated with the line item are transfer actions and no actions associated with the line item are suspend actions, transferring any balance remaining in association with the line item to a next payer;
if any actions associated with the line item are write-off actions, writing off the portions of the line item to which the actions relate; and
if the line item received any unfavorable adjudication codes, creating an entry for the line item in a denial management queue.

5. The computerized method of claim 1, wherein the explanation of benefits record further contains a check number, the processes, by the computer system operated on behalf of the provider, of the method further comprising:

identifying a deposit to a health care service provider's bank account, wherein the deposit has the same check number associated with the explanation of benefits record; and
associating the deposit with the claim referenced in the explanation of benefits record.

6. The computerized method of claim 5, the processes, by the computer system operated on behalf of the provider, of the method further comprising recording that payment was received for the line items marked as paid in the explanation of benefits record.

7. The computerized method of claim 6, the processes, by the computer system operated on behalf of the provider, of the method further comprising:
electronically notifying a user periodically of all deposits that have been received since a last notification.

8. The computerized method of claim 7, wherein the step of identifying the deposit to the health care service provider's bank account is performed by electronically accessing the health care service provider's bank account transaction history.

9. The computerized method of claim 8, wherein the step of electronically accessing the health care service provider's bank account transaction history is performed with a screen scraper.

10. The computerized method of claim 1, wherein the explanation of benefits record further contains:
a procedure code associated with each line item in the corresponding claim;
the processes, by the computer system operated on behalf of the provider, of the method further comprising:
from a plurality of claims, assembling payment data, wherein the payment data contains:
a plurality of procedure codes; and
amounts of payments received for each procedure code;
performing a statistical analysis of the payment data;
generating a set of expected payments for the procedure codes in the payment data;
performing a statistical analysis of the expected payments for the procedure codes in the payment data; and
from the statistical analysis of the payment data and the statistical analysis of the expected payments, calculating a metric relating the payment data and the expected payments.

11. The computerized method of claim 10, the processes, by the computer system operated on behalf of the provider, of the method further comprising:
displaying a table of the payment data, the expected payments, and the metric relating the payment data and the expected payments.

12. The computerized method of claim 10, the processes, by the computer system operated on behalf of the provider, of the method further comprising:
displaying a graph of the payment data, the expected payments, and the metric relating the payment data and the expected payments.

13. The computerized method of claim 10, the processes, by the computer system operated on behalf of the provider, of the method further comprising:
if the metric relating the payment data and the expected payments is outside a predetermined acceptable range for one of the procedure codes, alerting a user of the procedure code.

14. The computerized method of claim 10, wherein the payment data are stored in a relational database.

15. The computerized method of claim 14, wherein the relational database is configured according to a star schema.

16. The computerized method of claim 1, the processes, by the computer system operated on behalf of the provider, of the method further comprising:
  selecting a plurality of line items;
  displaying an interactive screen showing the plurality of line items;
  selecting one of the line items;
  displaying an interactive screen showing the data fields associated with the selected line item;
  editing the data field on the interactive screen; and
  changing the status of the line item.

17. The computerized method of claim 16, the processes, by the computer system operated on behalf of the provider, of the method further comprising:
  for any rejected line item in the computer system operated on behalf of the provider for which the value of the selected data field was the same as in the selected line item:
    automatically editing the data field; and
    changing the status of the line item.

18. The computerized method of claim 1, the processes, by the computer system operated on behalf of the provider, of the method further comprising:
  in connection with any transaction involving a partial payment of a line item of a given claim, classifying the partial payment as either satisfactory or unsatisfactory; and
  if the line item received an unsatisfactory partial payment, storing the transaction in association with the first unique identifier for the given claim and the second unique identifier for the line item.

19. The computerized method of claim 1, the processes, by the computer system operated on behalf of the provider, of the method further comprising:
  selecting at least a first claim and a second claim, wherein:
    the at least first claim and second claim each have at least one rejected line item; and
    the at least first and second claim share an initial common value in at least one data field;
  receiving a new common value for the data field from a user;
  setting the data field in the at least first claim and second claim to the new common value; and
  marking the at least first claim and second claim as partially resolved.

20. The computerized method of claim 1, the processes, by the computer system operated on behalf of the provider, of the method further comprising:
  receiving a settlement check associated with a plurality of claims in the computer system operated on behalf of the provider, wherein the computer system operated on behalf of the provider contains a database of claim data and payment data;
  for each associated claim:
    associating in the database a portion of the settlement check with the claim according to a distribution strategy;
    recording in the database a partial payment of the claim in the amount of the associated portion of the settlement check; and
    applying a settlement adjustment in the database to remaining unpaid balance for the charges associated with the claim.

21. The computerized method of claim 20, wherein the distribution strategy comprises:
  calculating a total of all outstanding charges associated with the plurality of claims;
  calculating a ratio of a value of the settlement check to the total of all outstanding charges; and
  for each of the plurality of claims, associating in the database a portion of the settlement check equal to the outstanding charge associated with the claim reduced by the ratio of the value of the settlement check to the total of all outstanding charges.

\* \* \* \* \*